United States Patent
Badding et al.

(10) Patent No.: US 10,396,396 B2
(45) Date of Patent: Aug. 27, 2019

(54) LITHIUM-ION CONDUCTIVE GARNET AND METHOD OF MAKING MEMBRANES THEREOF

(71) Applicant: Corning Incorporated, Corning, NY (US)

(72) Inventors: Michael Edward Badding, Campbell, NY (US); Curtis Robert Fekety, Corning, NY (US); Tricia Anne Harnas, Elmira, NY (US); Yanxia Ann Lu, Painted Post, NY (US); Ying Shi, Painted Post, NY (US); Zhen Song, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 15/994,276

(22) Filed: May 31, 2018

(65) Prior Publication Data

US 2018/0277893 A1    Sep. 27, 2018

Related U.S. Application Data

(62) Division of application No. 14/879,346, filed on Oct. 9, 2015, now Pat. No. 10,026,990.

(Continued)

(51) Int. Cl.
*H01B 1/08* (2006.01)
*C04B 35/48* (2006.01)
(Continued)

(52) U.S. Cl.
CPC ...... *H01M 10/0562* (2013.01); *C01G 25/006* (2013.01); *C04B 35/48* (2013.01); *C04B 35/50* (2013.01); *H01B 1/08* (2013.01); *H01M 10/0525* (2013.01); *C01P 2002/54* (2013.01); *C01P 2002/72* (2013.01);
(Continued)

(58) Field of Classification Search
CPC ... H01B 1/00; H01B 1/08; H01M 4/48; C04B 35/48; C04B 35/50
See application file for complete search history.

(56) References Cited

U.S. PATENT DOCUMENTS 8,658,317 B2    2/2014  Weppner et al.
8,986,895 B2    3/2015  Ohta et al.
(Continued)

FOREIGN PATENT DOCUMENTS

WO    2010090301 A1    8/2010
WO    2012114193 A1    8/2012
(Continued)

OTHER PUBLICATIONS

Truong et al "First total H+/Li+ ion exchange in garnet-type Li5La3Nb2)12 using organic acids and studies on the effect of Li stuffing", Inorg. Chem. 2012, 51, 1222-1224. (Year: 2012).*
(Continued)

*Primary Examiner* — Mark Kopec

(57) ABSTRACT

A gallium doped garnet composition of the formula:

$$Li_{7-3y}La_3Zr_2Ga_yO_{12}$$

where
y is from 0.4 to 2.0, and as defined herein. Also disclosed is a method for making a dense Li-ion conductive cubic garnet membrane, comprising one of two alternative lower temperature routes, as defined herein.

19 Claims, 19 Drawing Sheets

Related U.S. Application Data

(60) Provisional application No. 62/064,605, filed on Oct. 16, 2014.

(51) Int. Cl.
  *H01M 10/0562* (2010.01)
  *C04B 35/50* (2006.01)
  *C01G 25/00* (2006.01)
  *H01M 10/0525* (2010.01)

(52) U.S. Cl.
  CPC ...... *C01P 2002/77* (2013.01); *C01P 2002/88* (2013.01); *C01P 2004/03* (2013.01); *C01P 2006/32* (2013.01); *C01P 2006/40* (2013.01); *H01M 2300/0071* (2013.01)

(56) References Cited

U.S. PATENT DOCUMENTS

| | | | |
|---|---|---|---|
| 2010/0047696 | A1 | 2/2010 | Yoshida et al. |
| 2010/0203383 | A1 | 8/2010 | Weppner |
| 2011/0053002 | A1 | 3/2011 | Yamamura et al. |
| 2013/0084505 | A1 | 4/2013 | Iriyama et al. |
| 2013/0230778 | A1 | 9/2013 | Saimen et al. |
| 2014/0011100 | A1 | 1/2014 | Lee et al. |
| 2014/0287305 | A1 | 9/2014 | Wachsman et al. |
| 2015/0099188 | A1 | 4/2015 | Holme et al. |
| 2015/0130115 | A1* | 5/2015 | Sung .......... C04B 35/4885 264/406 |
| 2016/0111751 | A1* | 4/2016 | Badding .......... C01G 25/006 429/322 |
| 2016/0308244 | A1* | 10/2016 | Badding .......... C01G 25/006 |

FOREIGN PATENT DOCUMENTS

| | | | |
|---|---|---|---|
| WO | 2012176808 | A1 | 12/2012 |
| WO | 2013128759 | A1 | 9/2013 |
| WO | WO 2016061015 | * | 4/2016 |

OTHER PUBLICATIONS

Awaka et al; "Synthesis and Structure Analysis of Tetragonal Li7La3Zr2O12 With the Garnet-Related Type Structure"; Journal of Solid State Chemistry, 182 (2009); 2046-2052.
Cussen; "The Structure of Lithium Garnets: Cation Disorder and Clustering in a New Family of Fast Li+ Conductors"; Chem. Commun. (2006) pp. 412-413.
Deviannapoorani et al; "Lithium Ion Transport Properties of High Conductive Tellurium Substituted Li7La3Zr2O12 Cubic Lithium Garnets"; Journal of Power Sources, 240 (2013) 18-25.
Dhivya et al; "Li+ Transport Properties of W Substituted Li7La3Zr2O12 Cubic Lithium Garnets"; AIP Advances 3, 082115-1-082115-21 (2013).
Dumon et al; "High Li Ion Conductivity in Stronitum Doped Li7La3Zr2O12 Garnet"; Solid State Ionics 243 (2013) 36-41.
Geiger et al; "Crystal Chemistry and Stability of "Li7La3Zr2O12" Garnet: A Fast Lithium-Ion Conductor"; Inorg. Chem., 2011, 50, 1089-1097.
Howard et al "Effect of Ga Incorporation on the Structure and Li Ion Conductivity of La3Zr2Li7O12", Dalton Trans. 2012, 41, 12048-12053.
Huang et al; "Effect of Sintering Temperature on Structure and Ionic Conductivity of Li7-XLa3Zr2O12-0.5X (X=0.5~0.7) Ceramics"; Solid State Ionics; 204-205 (2011) 41-45.
Hubaud et al; "Low Temperature Stabilization of Cubic (Li7-XAlX/3) La3Zr2O12: Role of Aluminum During Formation"; Journal of Materials Chemistry A; 2013, 1, 8813-8818.
Imagawa et al; "Garnet-Type Li6.75LA3Zr1.75Nb0.25O12 Synthesized by Coprecipitation Method and Its Lithium Ion Conductivity"; Solid State Ionics, 262 (2014) 609-612.
International Search Report of the International Searching Authority; PCT/US2015/055192; dated Dec. 17, 2015; 5 Pages; European Patent Office.
Janani et al; "Influence of Sintering Additives on Densification and Li+ Conductivity of Al Doped Li7La3Zr2O12 Lithium Garnet"; RSC Adv., 2014, 4, 51228-51238.
Ji et al; "Advances in Li-S Batteries"; J. Mater. Chem., 2010, 20, 9821-9826.
Jin et al; "Ai-Doped Li7La3Zr2O12 Synthesized by a Polymerized Complex Method"; Journal of Power Sources, 196 (2011) 8683-8687.
Knudsen; "Dependence of Mechanical Strength of Brittle Polycrystalline Specimens on Porosity and Grain Size"; Journal of the American Ceramic Society, Aug. 1959; pp. 376-387.
Kokal et al; "Sol-Gel Synthesis and Lithium Ion Conductivity of Li7La3Zr2O12 With Garnet-Related Type Structure"; Solid State Ionics, 185 (2011) 42-46.
Kotobuki et al; "Compatibility of Li7La3Zr2O12 Solid Electrolyte to All-Solid-State Battery Using Li Metal Anode"; Journal of the Electrochemical Society, 157, (10) A1076-A1079 (2010).
Kotobuki et al; "Fabrication of All-Solid-State Lithium Battery With Lithium Metal Anode Using Al2O3-Added Li7La3Zr2O12 Solid Electrolyte"; Journal of Power Sources; 196 (2011) 7750-7754.
Lange et al; "Hindrance of Grain Growth in Al2O3 by ZrO2 Inclusions"; (1984), Journal of the American Ceramic Society, 67 (3), pp. 164-168.
Leo et al; "Lithium Conducting Glass Ceramic With Nasicon Structure"; Materials Research Bulletin, 37, (2002) pp. 1419-1430.
Li et al; "Optimizing Li+ Conductivity in a Garnet Framework"; J. Mater. Chem., 2002, 22, 15357-15361.
Matsui et al; "Phase Transformation of the Garnet Structured Lithium Ion Conductor: Li7La3Zr2O12"; Solid State Ionics; 2013; http://dx.doi.org/10.1016/j.ssi.2013.09.027.
Murugan et al; "Fast Lithium Ion Conduction in Garnet-Type Li7La3Zr2O12"; Angew. Chem. Int. Ed. 2007, 46, 7778-7781.
Murugan et al; "High Conductive Yttrium Doped Li7La3Zr2O12 Cubic Lithium Garnet"; Electrochemisty Communications, 13 (2011), 1373-1375.
Ni et al; "Room Temperature Elastic Moduli and Vickers Hardness of Hot-Pressed LLZO Cubic Garnet"; J. Mater. Sci., (2012) 47: 7978-7985.
Ohta et al; "All-Solid-State Lithium Ion Battery Using Garnet-Type Oxide and Li3BO3 Solid Electrolytes Fabricated by Screen-Printing"; Journal of Power Sources, 238 (2013) pp. 53-56.
Ohta et al; "Co-Sinterable Lithium Garnet-Type Oxide Electrolyte With Cathode for All-Solid-State Lithium Ion Battery"; Journal of Power Sources, 265 (2014) pp. 40-44.
Ohta et al; "Electrochemical Performance of an All-Solid-State Lithium Ion Battery With Garnet-Type Oxide Electrolyte"; Journal of Power Sources, 202 (2012) 332-335.
Ohta et al; "High Lithium Ionic Conductivity in the Garnet-Type Oxide Li7-X La3(Zr2-X, NbX)O12 (X=0-2)"; Journal of Power Sources, 196 (2011) 3342-3345.
Peng et al., "Low Temperature Synthesis of Li3La3Nb2O12 With Cubic Garnet-Type Structure by Sol-Gel Process," J. Sol-Gel Sci. Tech. 66 (2013) 175-179.
Ramakumar et al; "Structure and Li+ Dynamics of Sb-Doped Li7La3Zr2O12 Fast Lithium Ion Conductors"; Phys. Chem. Chem. Phys., 2013, 15, 11327-11338.
Rangasamy et al; "The Role of Al and Li Concentration on the Formation of Cubic Garnet Solid Electrolyte of Nominal Composition Li7La3Zr2O12"; Solid State Ionics, 206 (2012) 28-32.
Rettenwander et al; "A Synthesis and Crystal Chemical Study of the Fast Ion Conductor Li7-3XGaXLa3 Zr2O12 With X-0.08 to 0.84"; Inorg. Chem. 2014, 53, 6264-6269.
Saranya et al; "Li7-XLa3Sn2-XNbXO12 (X= 0.25-1) Cubic Lithium Garnet"; Materials Letters 77, (2012) 57-59.
Shimonishi et al; "Synthesis of Garnet-Type Li7-XLa3Zr2O12-1/2X and Its Stability in Aqueous Solutions"; Solid State Ionics, 183 (2011) 48-53.

(56) References Cited

OTHER PUBLICATIONS

Shinawi et al; "Stabilization of Cubic Lithium-Stuffed Garnets of the Type "Li7La3Zr2O12" by Addition of Gallium"; Journal of Power Sources, 225 (2013) 13-19.

Thangadurai et al; "Novel Fast Lithium Ion Conduction in Garnet-Type Li5La3M2O12 (M=Nb,Ta)"; J. Am. Ceram. Soc., 86 [3] (2003) pp. 437-440.

Wolfenstine et al; "Synthesis and High Li-Ion Conductivity of Ga-Stabilized Cubic Li7La3Zr2O12"; Materials Chemistry and Physics, 134 (2012) 571-575.

* cited by examiner

LITHIUM-ION CONDUCTIVE GARNET AND METHOD OF MAKING MEMBRANES THEREOF

CROSS REFERENCE TO RELATED APPLICATIONS

The present application claims the benefit of priority under 35 U.S.C. § 120 to U.S. Non-Provisional patent application Ser. No. 14/879,346, filed Oct. 9, 2015, now U.S. Pat. No. 10,026,990, which claims the benefit of priority under 35 U.S.C. § 119 to IJ.S. Provisional Patent Application No. 62/064,605, filed Oct. 16, 2014, the contents of both of which are relied upon and incorporated herein by reference in their entirety.

The entire disclosure of any publication or patent document mentioned herein is incorporated by reference.

BACKGROUND

The disclosure relates to a lithium-ion cubic conductive garnet composition methods of making membranes thereof.

SUMMARY

In embodiments, the disclosure provides a lithium-ion cubic conductive garnet composition including doped variants thereof, and methods of making membranes thereof.

BRIEF DESCRIPTION OF THE DRAWINGS

In embodiments of the disclosure.

DETAILED DESCRIPTION

Figure 1A:
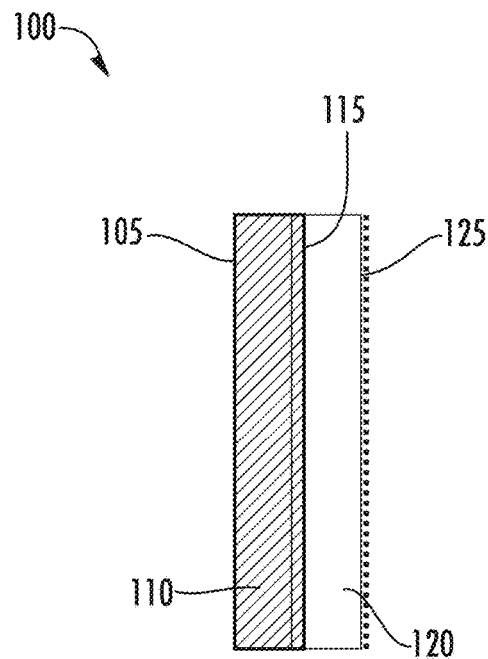
FIGS. 1A and 1B show schematic diagrams of prior art Li-metal battery structures: single cell (FIG. 1A; 100); and double cell (FIG. 1B; 150), including, for example, a battery cover (105), a Li metal anode (110), a solid electrolyte (115), an application media (120) such as air, water, or sea water, and an external cathode (125), that is outside the battery.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Non-flame combustion," "flameless combustion," or like terms refer, for example, to a chemical reaction accomplished by heating in the absence of a flame.

"Membrane" or "pellet" or like terms refer, for example, to a solid electrolyte component, which is part of the exterior walls of a lithium ion battery cell or like articles.

"Carbon source" or "carbon precursor" or like terms refer, for example, to "carbohydrate," "saccharide," and like terms, including monosaccharides, disaccharides, oligosaccharides, and polysaccharides. In general, the monosaccharides and disaccharides, which are smaller (lower molecular weight) carbohydrates, are commonly referred to as sugars.

"Sinter" or like terms refer, for example, to cause to become a coherent mass by heating without melting.

"Calcine," "calcination," or like terms refer, for example, to heat to a high temperature but without fusing to drive off volatile matter or to effect changes.

"Firing," "fire," or like terms refer, for example, to the process of maturing ceramic products by the application of heat.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Figure 1B:
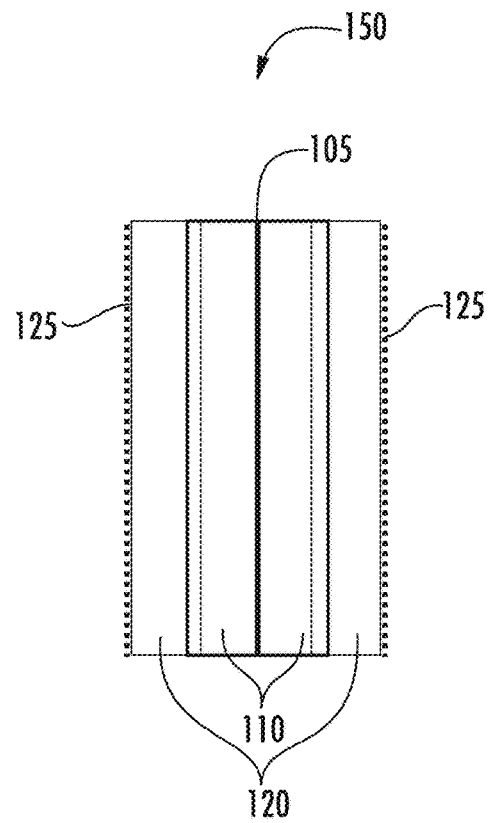

Fast Li-ion conductive solid electrolytes are of interest for application in Li-metal batteries and Li-ion batteries. In Li-metal batteries, solid electrolyte membranes are part of the outside walls of the battery cells as shown in the schematic drawings of single- and double-cell Li-metal battery structures, respectively, in FIGS. 1A and 1B, respectively. The solid electrolyte materials are expected to be chemically and electrochemically stable to Li metal, and to the application media, such as air, water, or sea-water. Solid electrolytes are also considered as an alternative to the commonly used organic and polymer electrolytes in Li-ion batteries to eliminate the potential issues of flammability and operating temperature limitations of the organic and polymer electrolytes. Among the solid electrolyte materials, Li-oxide garnets ("LLMO" in general), particularly $Li_7La_3Zr_2O_{12}$ ("LLZ"),[1 to 19] are of interest due to their high Li-ion conductivity ($10^{-4}$ S/cm) and high chemical stability with Li metal, and large electrochemical window (9V).

There are several obstacles to making a dense structure of the above mentioned garnet membranes and using them in a battery. These garnet oxides have high sintering temperatures, usually above 1200° C., during which a significant loss of Li can occur. Special processes, such as using a mother powder to bury the synthesized membrane/pellet,[7, 9] or using Pt to surround or encapsulate the membrane/pellet[4, 10] during sintering become necessary. However, using the mother powder for covering during calcination often causes sintering of the mother powder onto the membrane/pellet. A post-calcination polishing is often needed. When using Pt in covering, the Pt can migrate into the membrane or pellet, which can cause an electrical short circuit. A composition, method of making, or both, that allows the garnet oxides to sinter at a lower temperature would be highly advantageous.

LLMO garnet has two structures: tetragonal and cubic. The cubic garnet has a higher Li-ion conductivity than the tetragonal garnet.[4] However, in reported researches, the cubic structure has to be made at temperatures above 1200° C. Aluminum (Al) is often doped into garnet to stabilize the cubic phase.[6, 9, 12, 13] The doped Al substitutes for part of Li in garnet. Other doping studies have been reported, such as Ga doping (substitute for part of the Li[11, 15]), Nb, Y, Sb, W, and Te doping (substitute for part of the Zr and Li[8, 10, 16, 18, 21]) and Sr doping (substitute for part of the La[17]). US 2013/0230778 disclosed garnet compositions $Li_{7-y}La_{3-x}A_xZr_{2-y}M_yO_{12}$, where $0 \leq x \leq 3$, $0 \leq y \leq 2$, "A" can be selected from Y, Nd, Sm, and Gd; and M can be selected from Nb or Ta. A method of making or composition that allows formation of a highly conductive cubic structure would also be highly advantageous.

Prior methods of making garnet membranes/pellets, used solid-state reaction and the Pechini process.[1 to 19] A two-step calcination is usually used. In these processes, the precursor powder was first calcined at from 900 to 1200° C. to form cubic or tetragonal garnet. The powder was then ground and pressed into pellets. The pellets underwent a second calcination to about 1200° C. to form a dense cubic garnet. In the first calcination, volatile materials such as $CO_2$, $H_2O$, etc., were driven out of the powder, which helped to form a dense structure in the second calcination. In making garnet materials, workers have looked to nano-material processing method, such as the Pechini process, which is a modified sol gel process,[5, 7, 16] or a polymerized complex method,[15] or a co-precipitation method. It is expected that the nano-materials can lower the sintering temperature so that one can make a dense membrane at a lower temperature. Lower processing temperature prevents losing too much Li from the materials. However, so far, besides using hot pressing, lower processing temperature has not been successful in making a dense membrane at temperature below 1200° C.

In embodiments, the present disclosure provides a gallium doped garnet composition of the formula:

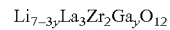

$$Li_{7-3y}La_3Zr_2Ga_yO_{12}$$

where
y is from 0.4 to 2.0, more preferably from 0.5 to 2.0, even more preferably from 0.6 to 2.0, and still more preferably from 0.66 to 2.0,
the formula can be determined by, for example, ion coupled plasma (ICP), and
the cubic phase of the composition can be determined by, for example, x-ray diffraction (XRD) to have a lattice constant, i.e., an XRD parameter, of 13.045 Angstroms compared to a lattice constant of 12.975 Angstroms obtained by firing the same cubic phase composition at above 1100° C.

In embodiments, the composition was obtained by low temperature firing at from 800 to 1000° C., such as exemplified by the second heating in Route B mentioned below.

In embodiments, y can be, for example, from 0.4 to 2.0.

In embodiments, the sintering temperature, i.e., the second heating in either Route A or Route B, of the composition is below 1000° C., for example, about 950° C. The literature has reported sintering garnet doped with other than Ga above 1150° C., see for example, R. Murugan, et al., High conductivity yttrium doped $Li_7La_3Zr_2O_{12}$ cubic lithium garnet, *Electrochem. Comm.* 13 (2011) 1373. A Ga-doped garnet has been reported to have a sintering temperature of 1080° C., but the report used a different method for sample preparation (see El Shinawi, et al., *J. Power Sources*, 225 (2013) 13-19).

In embodiments, the Li can be substituted by Ga with up to 50 mol %, to provide, for example, a compound of the formula $Li_4La_3Zr_2Ga_1O_{12}$ (i.e., 1 Ga atom substituted for 3 Li atoms). In embodiments, the La can be substituted with Y up to 30 mol % to provide, for example, a compound of the formula $Li_7La_{2.7}Y_{0.3}Zr_2O_{12}$ (i.e., 1 Y atom substituted for 1 La atom). In embodiments, the Zr and Li can be substituted by Nb with up to 100 mol % to provide a compound, for example, of the formula $Li_6La_3ZrNbO_{12}$ (i.e., 1 Nb substituted for 1 Zr and 1 Li).

In embodiments, the present disclosure provides two related but different methods of making a Li-ion conductive cubic garnet membrane, referred to as Route A and Route B.

In embodiments, the present disclosure provides a method of making (Route A) a Li-ion conductive cubic garnet membrane, comprising:

forming a nitrate source aqueous solution comprised of a first nitrate source and a nitrate dopant source;

contacting the nitrate source aqueous solution and a carbohydrate source in mole ratio of from 1:1 to 1:4, and a first heating from 200 to 550° C., to form a nano-particle ash (The first heating can begin at, for example, about 200° C., and the solution begins to foam, and starts to combust (no-flame). The upper end of the first heating range of 550° C. is the top temperature during the flameless combustion);

a second heating (Route A)(1410) of the nano-particle ash at from 650 to 700° C. to produce a garnet nanoprecursor having nano-sized particles of from 10 to 100 nm;

pelletizing the garnet nanoprecursor to form a Li-ion conductive cubic garnet pellet; and a third heating (1450) of the pelletized garnet pellet at a top temperature of from 950 to 1200° C., at from 0.5 to 30 hrs, to form a dense membrane of the Li-ion conductive cubic garnet.

In embodiments, the first nitrate source comprises a mixture of each of $LiNO_3$, $La(NO_3)_3$, and $ZrN_2O_7$; the nitrate dopant source can be selected from at least one element from the Groups IIA to VIIA, and IIIB to IVB from the periodic table of elements; the carbohydrate source can have from 5 to 10 carbon atoms; and the nano-particle ash has a size of from 10 to 50 nm.

In embodiments, the carbohydrate source can have, for example, from 5 to 10 carbon atoms. In embodiments, the carbohydrate source can be selected from, for example, a carbohydrate, a complex sugar, a simple sugar, a disaccharide such as sucrose, a monosaccharide, or a combination thereof.

In embodiments, the dense membrane of the Li-ion conductive cubic garnet has a Li-ion conductivity of from $0.2 \times 10^{-3}$ to $2.0 \times 10^{-3}$ S/cm.

In embodiments, the third heating of the pelletized garnet nano-precursor (i.e., nano-sized particles) is held at 800° C. for 2 to 6 hrs to form a pure cubic garnet phase and to stabilize the pure cubic garnet phase.

In embodiments, the third heating can be accomplished, for example, in a closed platinum vessel, and the pellet can be surrounded, for example, in a garnet burying powder selected from at least one micrometer sized Li-oxide garnet.

The garnet burying powder can preferably be doped so that the burying powder has a cubic phase and a high sintering temperature. An Al-doped garnet is an example. The burying powder is different from the membrane powder in particle size. The burying powder has a particle size ($D_{50}$) of from 1 to 10 micrometers. The powder for making a membrane has a particle size ($D_{50}$) of from 30 to 700 nanometers The burying powder is also a different material from the membrane powder because of different doping.

In embodiments, the nitrate dopant source is selected from at least one a metal nitrate, or a mixture of at least two (i.e., two or more) different metal nitrates.

In embodiments, suitable metal nitrates can include, for example, $Ga(NO_3)_3$, $Al(NO_3)_3$, and like metal nitrates, or mixtures thereof.

In embodiments, the nitrate dopant can be generated in situ from a (e.g., by combining any appropriate reactants such as a metal and nitric acid. A suitable nitrate dopant source can be, for example, a Mo metal and nitric acid.)

In embodiments, the method of making via Route A can further comprise adding from 1 to 20 wt % excess of a nitrate source containing Li, for example, $LiNO_3$, to compensate for the loss, e.g., by evaporation, of Li during the third heating.

In embodiments, the Li-ion conductive cubic garnet produced can be a composition of the formula, for example:

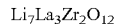

where any of the Li, La, Zr, or a combination thereof, is partially or fully substituted by at least one dopant selected from at least one element from Group IIA to VIIA, IIIB to IVB, or a combination thereof. As example, Li can be substituted up to 50 mol %, La can be substituted up to 30 mol %, and Zr can be substitute up to 100 mol %.

In embodiments, the disclosure provides a method of making a Li-ion conductive cubic garnet referred to a Route B, comprising:

forming a nitrate source aqueous solution comprised of a first nitrate source and a nitrate dopant source;

contacting the nitrate source aqueous solution and a carbohydrate source in mole ratio of from 1:1 to 1:4, and a first heating of the mixture from 200 to 550° C., to form a nano-particle ash;

a second heating (Route B)(1420) of the nano-particle ash at from 775 to 1000° C. to produce a Li-ion conductive pure cubic garnet powder having micron-sized particles having irregular shape;

milling the cubic garnet powder to produce a sub-micron powder;

pelletizing the sub-micron powder to form a garnet pellet; and a third heating of the garnet pellet at from about 950 to about 1200° C. to form a dense Li-ion conductive cubic garnet membrane.

In embodiments, the third heating can be accomplished, for example, in a closed platinum vessel, and the pellet can be surrounded, for example, in a burying powder selected from at least one micrometer sized Li-oxide garnet.

In embodiments, the first nitrate source can comprises a mixture of $LiNO_3$, $La(NO_3)_3$, and $ZrN_2O_7$; the nitrate dopant source can be selected from at least one element from the Groups IIA to VIIA, and IIIB to IVB; the carbohydrate source can have from 5 to 10 carbon atoms; and the cubic garnet powder can have irregularly shaped and porous particles before milling, and the cubic garnet powder can have sub-micron-sized particles of from 100 nm to 1000 nm after milling.

In embodiments, the carbohydrate source can have, for example, from 5 to 10 carbon atoms. In embodiments, the carbohydrate source can be selected from, for example, a carbohydrate, a complex sugar, a simple sugar, a disaccharide, a monosaccharide, or a combination thereof.

In embodiments, milling can be accomplished by, for example, jet milling or attrition milling, to provide submicron-sized particles such as about 600 nm. In embodiments, milling to a particle size of from 200 to 600 nm is preferred.

In embodiments, the nitrate dopant can be generated in situ from a nitrate dopant source (e.g., by combining any appropriate reactants such as a metal or, metal salt, and nitric acid). In embodiments, the nitrate dopant can be selected from, for example, at least one metal nitrate, or mixtures thereof. Suitable metal nitrates can include, for example, $Ga(NO_3)_3$, $Al(NO_3)_3$, and like metal nitrates, or mixtures thereof. A suitable nitrate dopant source can be, for example, a Mo metal and a source of nitric acid.

In embodiments, the method of making of Route B can further comprise adding from 1 to 20 wt % excess of a nitrate source containing Li, for example, $LiNO_3$, to compensate for the loss, e.g., by evaporation, of Li during the third heating.

In embodiments, the dense membrane can have a Li-ion conductivity of, for example, from $0.2\times10^{-3}$ to $2.0\times10^{-3}$ S/cm.

In embodiments, the as-prepared ash can be milled to break down agglomerates, which have a two-dimensional flake shape.

In embodiments, the second heating of the pelletized Li-ion conductive cubic garnet, e.g., garnet oxides, can be accomplished, for example, at from 0.5 to 30 hrs, of the second heating at the top temperature of at from 650 to 700° C. at from 775 to 1000° C., i.e., a lower sinter temperature compared to the prior art.

In embodiments, the dense membrane can have a Li-ion conductivity of about $0.2\times10^{-3}$ S/cm to $2\times10^{-3}$ S/cm, e.g., above $2\times10^{-4}$, such as $1\times10^{-3}$ S/cm.

In embodiments, the cubic garnet has a Li-ion conductivity of, for example, from 0.5 to $1.7\times10^{-3}$ S/cm. The garnet has a conductivity, which is different from the dense membrane, for example, above about $5\times10^{-4}$ S/cm.

In embodiments, the dense membrane can have a grain size of, for example, from 1 to 100 microns, from 1 to 50 microns, from 1 to 10 microns, and like values, including intermediate values and ranges.

In embodiments, the dense membrane can have a grain size of, for example, from 100 to 600 microns. The upper limit of the grain size is confined by the membrane thickness.

In embodiments, the disclosure provides garnet composition to control the size of the grains in the dense membrane, for example, a dense membrane having a Li concentration of from 10 to 30 mol % less than that in a compound of the formula $Li_7La_3Zr_2O_{12}$.

In embodiments, the garnet can have, for example, a pure cubic phase.

In embodiments, the nitrate precursor can be selected from, for example: $LiNO_3$, $La(NO_3)_3$, $ZrN_2O_7$, and mixtures thereof.

In embodiments, the method can further comprise, for example, at least one of:
adding a nitride dopant prior to contacting the aqueous solutions;
generating a nitride dopant in situ by, for example, reaction of a metal or a metal oxide with nitric acid;
or combinations thereof,
and the dopant being selected from at least one of $Ga(NO_3)_3$, $Al(NO_3)$, or mixtures thereof.

In embodiments, the above mentioned metal nitrate precursors can be formed, for example, in situ, in the solution by reaction of a metal or a metal oxide with nitric acid.

In embodiments, the carbohydrate source can be selected, for example, from a carbohydrate, a complex sugar, a simple sugar, e.g., sucrose, lactose, maltose, etc., a disaccharide, a monosaccharide, or a combination thereof.

In embodiments, the carbohydrate source can have, for example, from 5 to 10 carbon atoms.

In embodiments, the carbohydrate source can be, for example, sucrose.

In embodiments, the present disclosure provides a method of making a cubic garnet powder, comprising:
a first heating of the as-prepared ash to 800° C. for about 2 to 6 hours, for example, 4 hours.

In embodiments, the present disclosure provides a method of making a cubic garnet membrane, comprising:
pelletizing the abovementioned Li-ion conductive cubic garnet; and
accomplishing a second heating of the pelletized Li-ion conductive cubic garnet at from about 950 to about 1200° C. to form a dense membrane.

In embodiments, the second heating can be accomplished, for example, in a closed platinum vessel, and the pelletized Li-ion conductive cubic garnet membrane can be surrounded in, for example, a burying powder.

In embodiments, the burying powder can be selected, for example, from at least one micrometer sized Li-oxide garnet powder.

In embodiments, the micrometer size Li-garnet burying powder can be selected from, for example, high melting temperature Li-oxide garnet, e.g., Al-doped Li-oxide garnet.

In embodiments, the disclosure provides a method of making a Li-ion conductive membrane from the cubic garnet by a nano-material route.

In embodiments, the disclosure provides a non-flame combustion method for making a garnet membrane via a nano-material process. By using a non-flame combustion approach, it is possible to make nano-size garnet precursors. These precursors can then be pressed into pellets and calcined to make a membrane directly. A fully sintered membrane can be made by firing at 950° C. Such membranes can have an ionic conductivity as high as, for example, $1.7\times10^{-3}$ S/cm.

In embodiments, the disclosed lower processing temperatures minimizes or eliminates the loss of lithium.

The nano-sized starting materials can be made by, for example, a non-flame combustion method. In the non-flame combustion method, a nitrate precursor or nitrate source reacts with a suitable carbon source, for example, a sugar, such as sucrose, at a nitrate source solution to carbon source solution molar ratio of from 1 to 4, and preferably from 2 to 3. With these ratios, the reaction induces a mild non-flame combustion of the reactants, leaving an ash in nano-particle form. The particle size is, for example, about 20 nm. After a brief post-combustion-calcination to 700° C., all remnant combustible materials can be removed from the ash, while the nano-particles can still retain their size at about 50 nm. The resulting nano-powder can be used to directly make a garnet membrane.

In embodiments, in a second or later sintering process, the well mixed nano-garnet starting materials permit forming of a cubic phase garnet at a much lower temperature (e.g., at about 800° C.) compared to micron-size starting materials in a solid state reaction (e.g., at about 1100 to 1200° C.). In embodiments, the disclosure provides a method of making a garnet membrane having a significant firing process modification, which modification prevents Li-loss and also keeps the Li-ion conductive membrane intact. With different doping, the $Li_7La_3Zr_2O_{12}$ (LLZ) garnet can have different sintering temperatures. This sintering temperature can also be modified with particle size. A higher sintering temperature LLZ-garnet, for example, Al-doped LLZ garnet in micro-size, which is found to sinter at 1230° C., can be used as a burying powder to cover the membranes during firing. The membrane can be made from low temperature sintered materials, for example, Ga-doped LLZ garnet, which starts to sinter, for example, at 950° C. The firing temperature schedule is significant for obtaining pure cubic garnet at lower temperatures, such as 800 to 1,000° C.

In embodiments, the disclosed process is advantaged in several aspects.

The non-flame combustion process produces significantly smaller size particles (e.g., about 20 nm) compared to the Pechini process (a modified sol gel process, that produces particles of about 100 nm). Smaller particles are more reactive, resulting in forming garnet at much lower temperature. The experimental results of the disclosure show that, for example, the Ga-doped LLZ nano-sized starting materials made by non-flame combustion can form a near pure (e.g., having a purity of from 95 to 100%) cubic garnet at 800° C. A Pechini process using garnet starting materials formed tetragonal garnet at 900° C., and cubic garnet at above 1100° C. Compared to a micron-sized powder solid state reaction, garnet (all in cubic phase) is often formed at above 1200° C.

In embodiments, the disclosed non-flame-combustion method of Route A produced a powder product that can be used to make a membrane directly (unlike the Pechini process and the micro-powder process, in which the powder has to be heated to 900 to 1200° C. to allow the precursor to fully react to remove all volatile materials, and then the garnet powder is ground). The garnet powder product is then pelletized to pellets, and then subjected to a second firing to about 1200° C. to form densely sintered pellets or also know as a membrane or pellet membrane.

The disclosed non-flame-combustion made nano-powder can be used to form different size grain membranes by adjusting the composition and firing conditions. The adjustable grain size can be, for example, in a smaller size range of from 1 to 100 microns, or preferably from 1 to 20 microns, or in a larger size range of from 100 to 600 microns. For large-size grain membranes, one grain may cover the whole thickness of the pressed pellets (i.e., the membrane; see FIG. 11).

The disclosed nano-particle ash made by non-flame-combustion can be sintered to form a dense membrane at about 950° C., and the dense membrane has satisfactory Li-ion conductivity of, for example, about $1\times10^{-3}$ S/cm.

The collection efficiency of the disclosed non-flame-combustion nano-particle production process is about 100%.

High calcination temperatures for densifying the LLZ membranes can cause significant loss of Li. To prevent loss of Li, the mother powder of the membrane is usually used to bury the membrane during the calcination. However, after calcine, the mother powder can stick onto the membrane and require a polishing treatment to remove the mother powder from the membrane. In the disclosed method of making, a nano-powder was used to make the membrane, and a micron-size powder was used as the burying powder. In the disclosed method of making, differently doped LLZ garnet powders were used, which doped powder has a higher sintering temperature, to cover the membrane that has a lower sintering temperature. For example, an Al-doped micron-sized LLZ powder was used to cover a membrane made of Ga-doped LLZ powder or precursors. The burying powder can be easily brushed-off from the membrane after calcine and without the need for removal of micron sized mother or buring powder.

General Preparative Method

Li-ion conductive garnet materials or membranes were prepared using a non-flame combustion method. In this method, nitrate precursor materials, usually nitrates, such as $LiNO_3$, $La(NO_3)_3$, $ZrN_2O_7$, and like compounds, were dissolved in water to form a clear solution with total molar concentration of about 3 M. The carbon source or carbohydrate compound, for example, a sugar, such as sucrose, was combined such as added into the nitrate precursor solution with a molar concentration ratio of from 1 to 4 times the total nitrate precursor molar concentration. A preferred amount of carbon source such as sucrose was a mole ratio, for example, of about 1 to 4 times, and about 2 to 3 times the total nitrate precursor, such as 2 to about 4 M. Carbon source solutions were preferably prepared at or near saturation to minimize excess water and water removal. The combined solution was then heated to evaporate some of the water. With a further increase in the temperature, the solution began to foam and turn brown. At temperatures of about 200° C., the reaction between nitrates and sucrose began. The reaction was accompanied by non-flame combustion, and eventually left an ash powder in the reactor. The highest temperature during the combustion was about 550° C. Some free carbon remains in the powder making the powder appear grey color.

Figure 2:
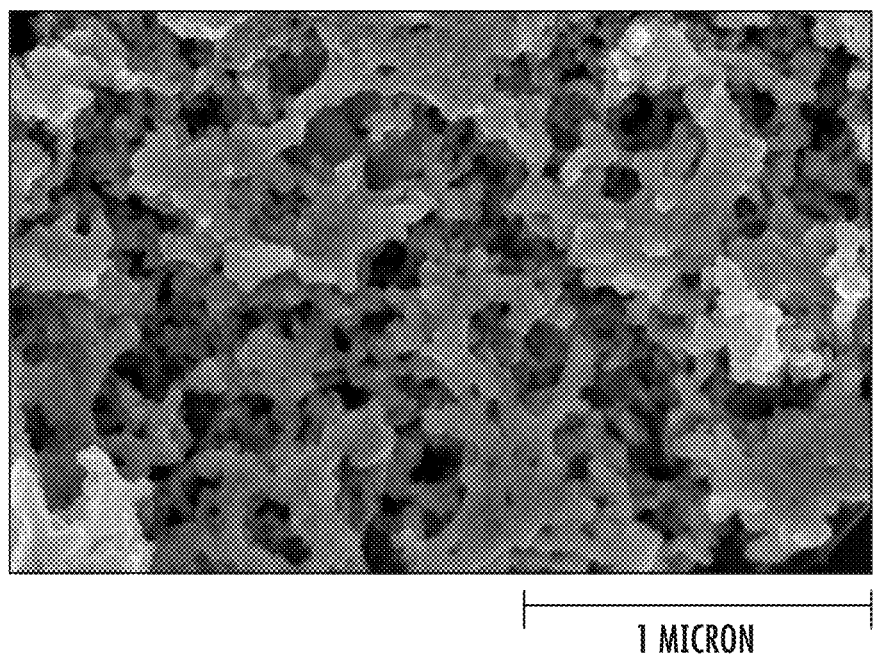
FIG. 2 shows an SEM image of a product powder or ash obtained from the disclosed non-flame combustion process. The particle size was about 20 nm. These particles are loosely connected to form two dimensional structures arising from the bubble films formed during heating the precursor solution.

FIG. 2 shows the SEM of the as-combusted powder. The particle size was about 20 nm. These particles are loosely connected to each other and form two dimensional structures, which arise from the bubble films formed during the heating the precursor solution.

During the non-flame combustion, only gasses were given off. These gasses were mainly $CO_2$ and $N_2$, with small amounts of CO or $NO_x$. There should be no loss of metal elements, considering that the highest temperature reached during combustion is about 550° C. The theoretical metal oxides collection efficiency should be near 100%.

Figure 3:
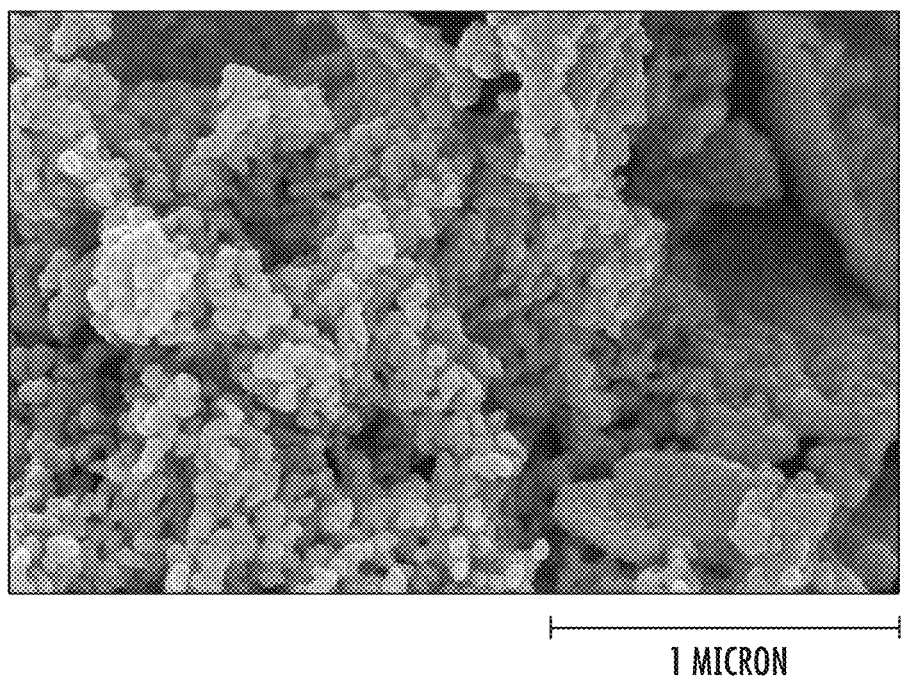
FIG. 3 shows an SEM image of a powder produced by non-flame-combustion and after heating to 700° C. for 4 hours.

By heating the as-combusted powder to 700° C., one can remove the remaining carbon. In the disclosed methods, the powder in alcohol was first ball milled for 24 hrs to break up the loose agglomerates, and then the solution was dried to obtain a powder. The powder was then heated to 700° C. for 4 hours. After this calcination, the powder turns pure white. FIG. 3 is an SEM image of the powder after 700° C. calcination showing that the particle size increased to about 50 nm after the 700° C. heat treatment.

Figure 4:
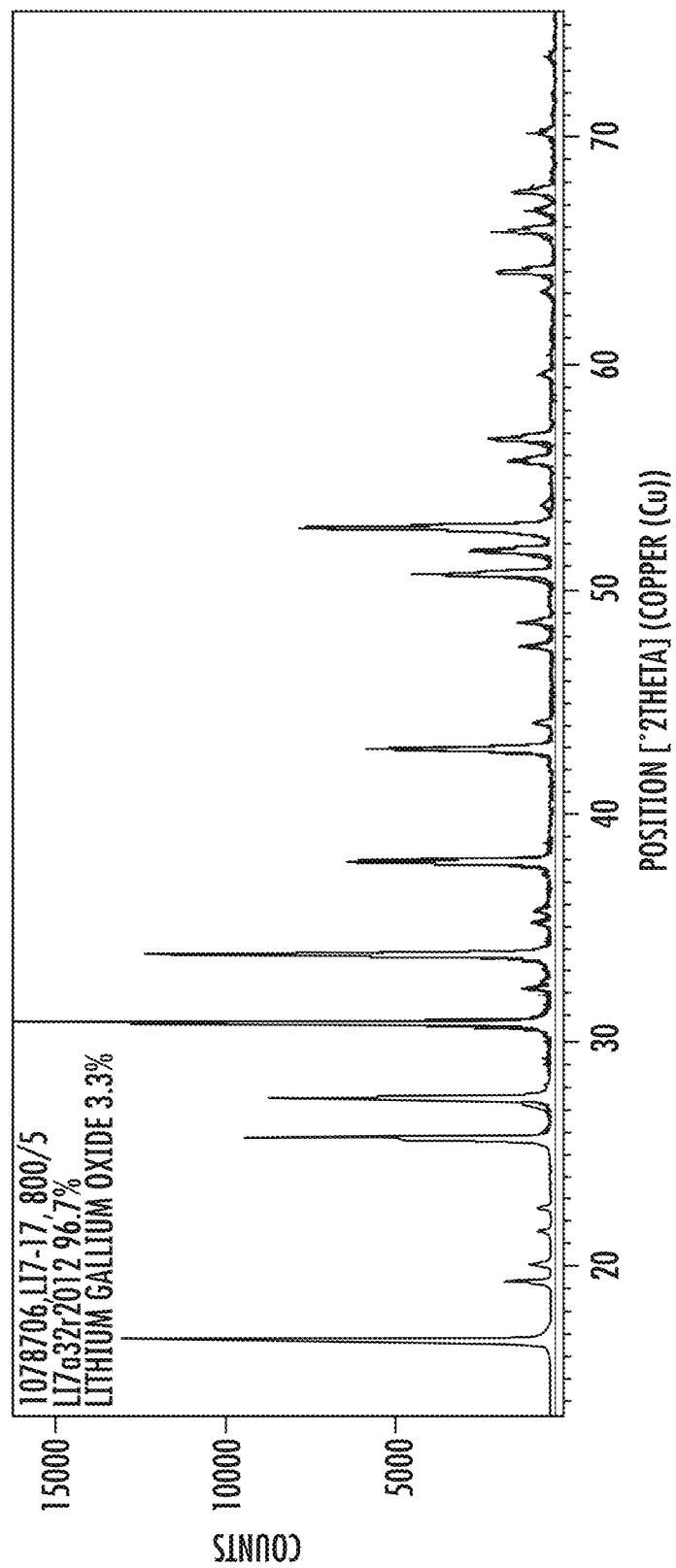
FIG. 4 shows an X-ray diffractive spectrum of an Ga-doped garnet powder formed in the disclosed non-flame-combustion method having a 97% cubic garnet content and after being calcined at 800° C. for 5 hrs.

Doping of the garnet crystal can stabilize the cubic phase, which has shown higher Li-ion conductivity than the tetragonal phase garnet. In non-flame-combustion, the doping can be done by adding the doping element precursors into the precursor solution. For example for Al doping, a certain amount of $Al(NO_3)_3$ was used. The certain amount was determined depending on the specific empirical or molecular formula of the particular compound being prepared, e.g., using an exact stoichiometric or mole equivalent, or a slight excess of the dopant to be substituted into the preceding compound. For Ga doping, a certain amount of $Ga(NO_3)_3$ was used. The doped powder can form a stable cubic phase. Nano-size materials allow the solid reactions to occur at much lower temperatures. For example, a Ga-doped powder can form 97% cubic garnet phase when heated to 800° C. for 4 hrs, see the XRD in FIG. 4. The cubic phase can remain stable to higher temperatures, see FIG. 7.

EXAMPLES

The following examples demonstrate the differences between the garnet formed through the disclosed nano-material Route A and the disclosed micro-material Route B. The following examples also provide the Li-ion conductivities of the prepared garnet membranes.

Example 1

Comparison of Ga-Doped LLZ Garnet Formation Temperature for Nano-Materials and Micro-Materials.

Figure 5:
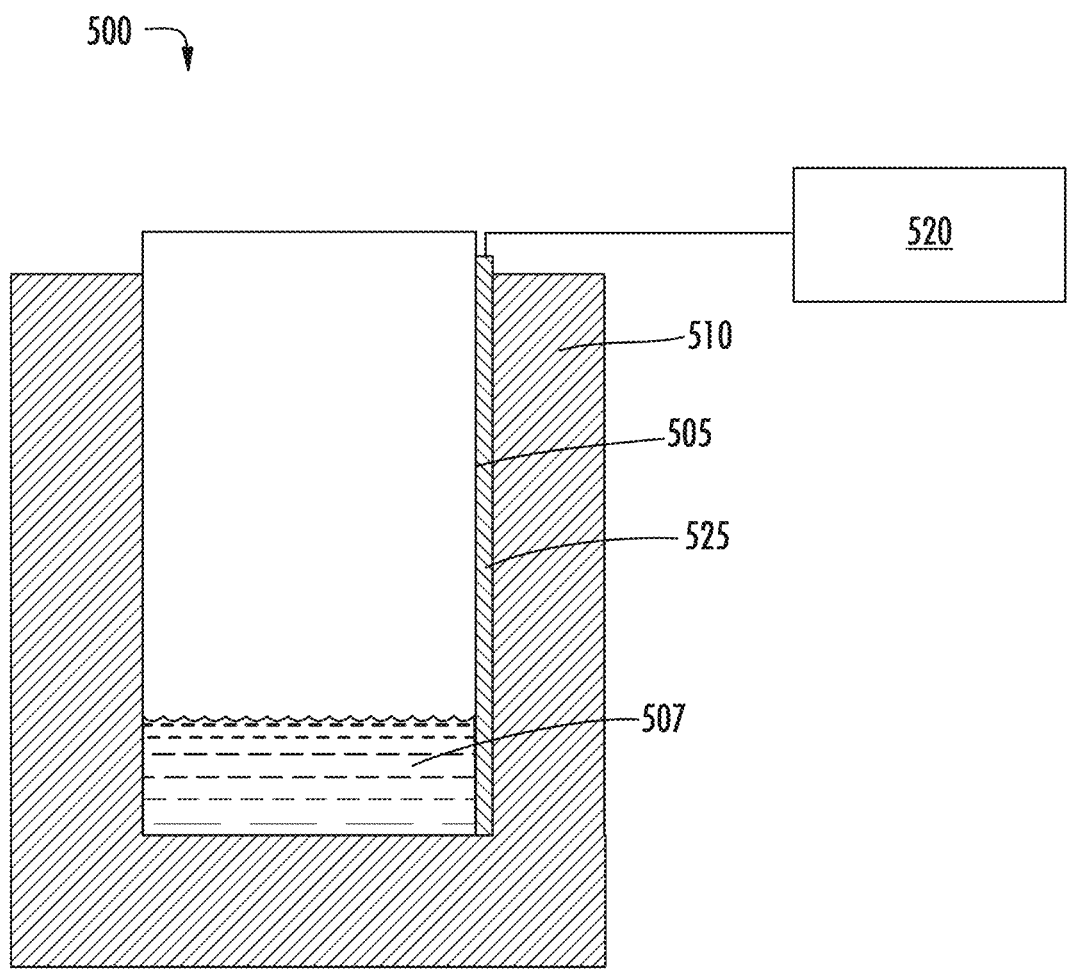
FIG. 5 shows a schematic of the apparatus (500) for non-flame combustion used to make nano-garnet powder. including: a container (505) such as a beaker, bucket, or like container; a heating mantle (510) air bath, or like heating device including means to control the temperature; a precursor solution (507) containing source reactants, that is, before reaction; a temperature meter (520); and a thermocouple (525).

Ga-doped Li-oxide garnet was made by two method: the disclosed non-flame combustion method, and a comparative method used in a conventional solid state reaction (SSR) method. In the non-flame combustion method, $LiNO_3$, $La(NO_3)_3 \cdot 6H_2O$, $ZrN_2O_7 \cdot xH_2O$, and $Ga(NO_3)_3$ were dissolved in water with a molar ratio of 7.0:3.1:2.0:0.8 to form a clear solution having a total concentration of 2.9 M. Sucrose a the carbon source, having two times (2x) the number of moles of the total nitrate precursor moles was added to the solution, for example, nitrate precursor moles was 3.1 and the sucrose moles was 6.2. Next, about 50 mL of the solution of nitrate precursor and sucrose was poured into a 600 mL beaker, which was mounted in a heating mantle, see for example, FIG. 5. The solution was mildly heated to evaporate the water. With the increase of the temperature with gradual concentration, the solution foamed and turned brown. At around 200° C., the reaction between the nitrate precursor and sucrose started, accompanied with non-flame combustion. The highest temperature during the combustion was about 550° C. After the non-flame combustion, about 5 g of the residual powder was collected. ICP measurement showed that this powder had a nominal molecular formula of $Li_{6.41}La_3Zr_2Ga_{0.6}O_x$.

In a comparative conventional solid state reaction (SSR) method, the precursors were $Li_2CO_3$, $La_2O_3$, $ZrO_2$, and $Ga_2O_3$. These precursors were mixed at molar ratio of 6.5:3.0:2.0:0.58, and then heated to about 1200° to allow the precursors to react to form garnet.

Figure 6:
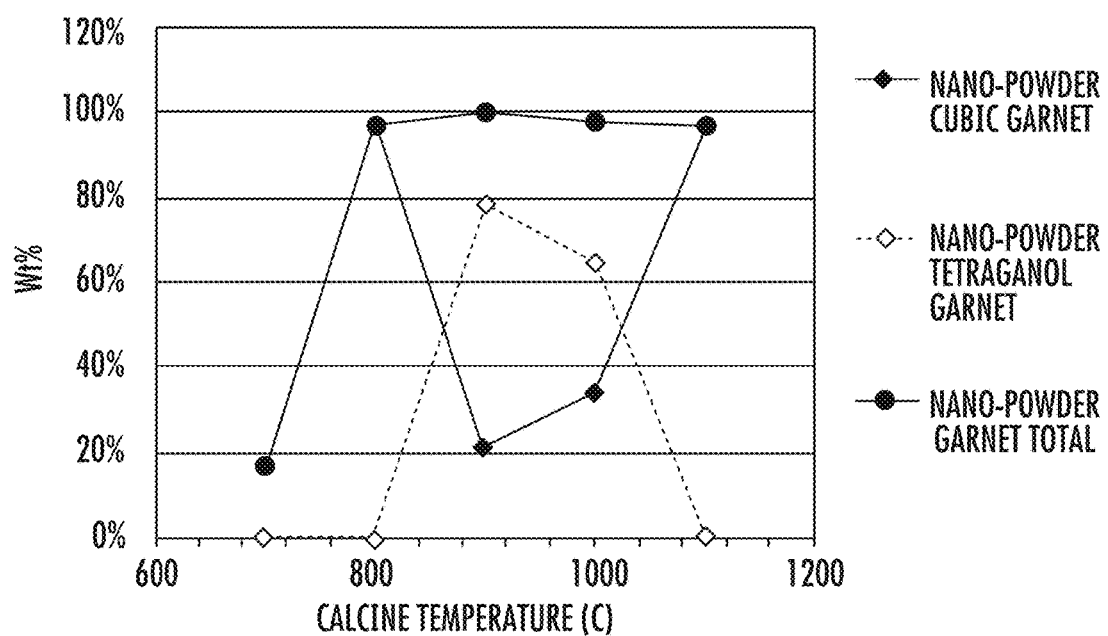
FIG. 6 shows XRD measured garnet phase development in a Ga-doped nano-sized powder when the powder was heated to the indicated temperatures with the temperature ramping rate at 200° C./hr.

For nano-powder, the firing schedule was significant to forming the cubic phase garnet. FIG. 6 shows the phase transformation of Ga-doped nano-powder by firing the powder to different temperatures with a ramping speed of 200° C./hr. At 800° C., the nano-powder fully reacts and forms 97% cubic phase garnet, with small amounts of $LiGaO_3$ impurities. However, when the powder was heated to 900° C., a tetragonal phase developed and became the dominate phase. This tetragonal phase completely shifts back to a cubic phase at 1100° C.

Figure 7:
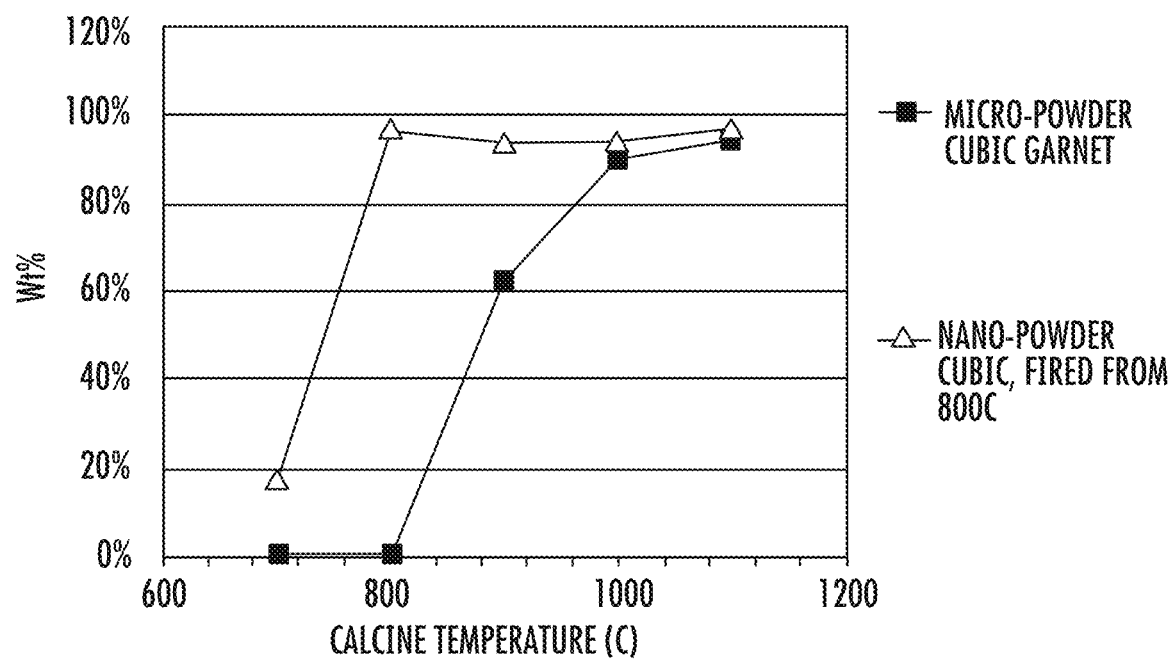
FIG. 7 shows XRD measured cubic garnet phase development in a Ga-doped nano-powder (squares) and a micropowder garnet cubic (triangles) at different calcining temperatures.

FIG. 7 shows the XRD measured garnet phase development with temperature for both nano-powder and micro-powder. In the nano-powder firing, when firing to 800° C. and higher, the firing was maintained at 800° C. for 4 hours, and then continued to ramp to higher temperatures with a rate of 100° C./hr. From FIG. 7, the nano-powder reacts and forms cubic garnet even at 700° C. About 17 wt % cubic garnet was detected after the 700° C. heat treatment. The powder reacts completely and forms almost pure cubic garnet at 800° C. A trace amount of $LiGaO_2$ was observed. With this firing schedule, the cubic phase was retained in higher temperature firing. The micro-powder reacts slowly, and the cubic garnet increase gradually with temperature until 1100° C. to form pure cubic garnet phase. In both powder, no tetragonal garnet was observed in any stage of the firing.

In the nano-powder firing to above 800° C., the firing remained at 800° C. for at least 4 hours, and was then increased to higher temperatures. FIG. 7 shows a graph of cubic garnet weight percent versus calcine temperature for samples made by the disclosed nano-route and compared to samples made by the micro-powder route. The low temperature cubic garnet was only observed with nano-powder synthesis route. The disclosed sintering method at from 800° C. to 1000° C. provides a stable low temperature cubic garnet. The low temperature garnet was observed with other nano-processes at about 800° C., but it was assumed to be unstable, and converted into tetragonal garnet when the temperature was increased, such as to 900° C. The results indicate that the conductivity of the low-temperature cubic garnet is accessible when the nano-powder is sintered at low temperature.

Example 2

Comparison of Al-Doped Garnet Formation Temperature for Nano-Materials and Micro-Materials Al-doped Li-oxide garnet was made by two methods: one method used the disclosed non-flame combustion, and the other method used a conventional solid state reaction (SSR). In the non-flame combustion method, $LiNO_3$, $La(NO_3)_3 \cdot 6H_2O$, $ZrN_2O_7 \cdot xH_2O$ and $Al(NO_3)_3 \cdot 9H_2O$ were dissolved in water with molar ratio of 7.55:3.13:2.0:0.24 to form a clear solution having total concentration of 3.0 M. Sucrose having a mole amount two times (2x) the total precursor moles was added to the solution. After the non-flame combustion preparation, the obtained powder had a nominal molecular formula of $Li_{62}La_3Zr_2Al_{0.2}O_x$, measured by ICP.

Figure 8:
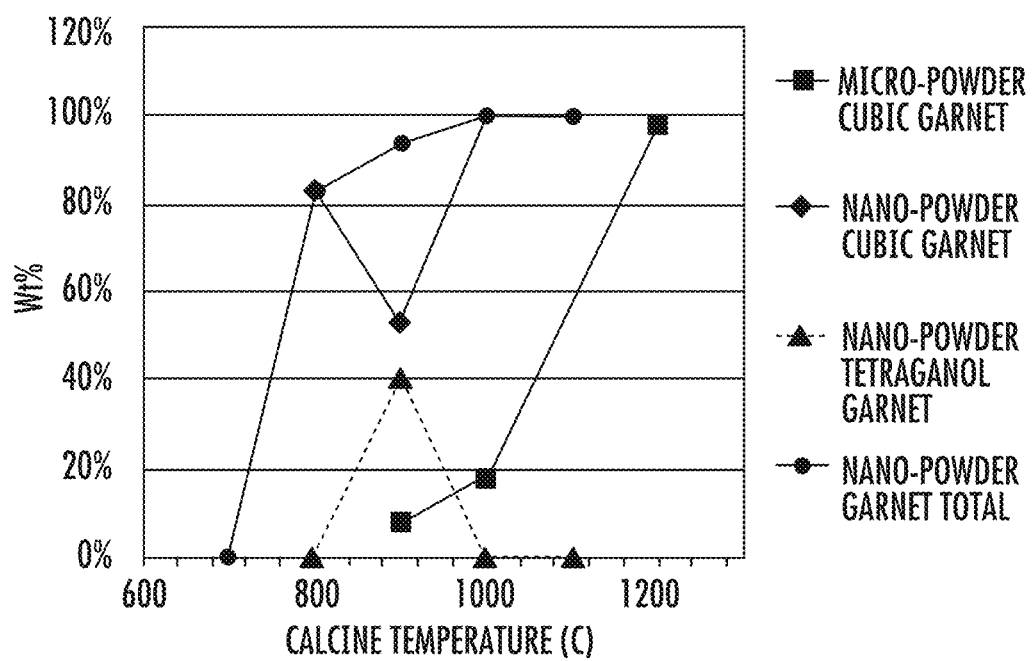
FIG. 8 shows XRD measured phase development of Al-doped LLZ garnet precursors to compare the garnet phase formation through nano-powder and micropowder routes.

FIG. 8 shows the XRD measured phase development of the Al-doped LLZ nano-powder, compared with a same composition micro-powder made by SSR process. The Al-doped nano-powder formed about 87% cubic phase at 800° C., followed with a partial shift of the phase to tetragonal, and then changed back to 100% cubic phase at 1000° C. A temperature hold at 800° C. for 4 hours did not prevent the garnet phase shifting to tetragonal at 900° C. The same composition micro-powder developed cubic phase garnet gradually without tetragonal phase at any temperature, and formed near 100% cubic phase at 1200° C.

Example 3

Thermal Analysis (TGA/DSC) was used to measured the differences in the reaction temperature for nano- and micro-materials.

Figure 9A:
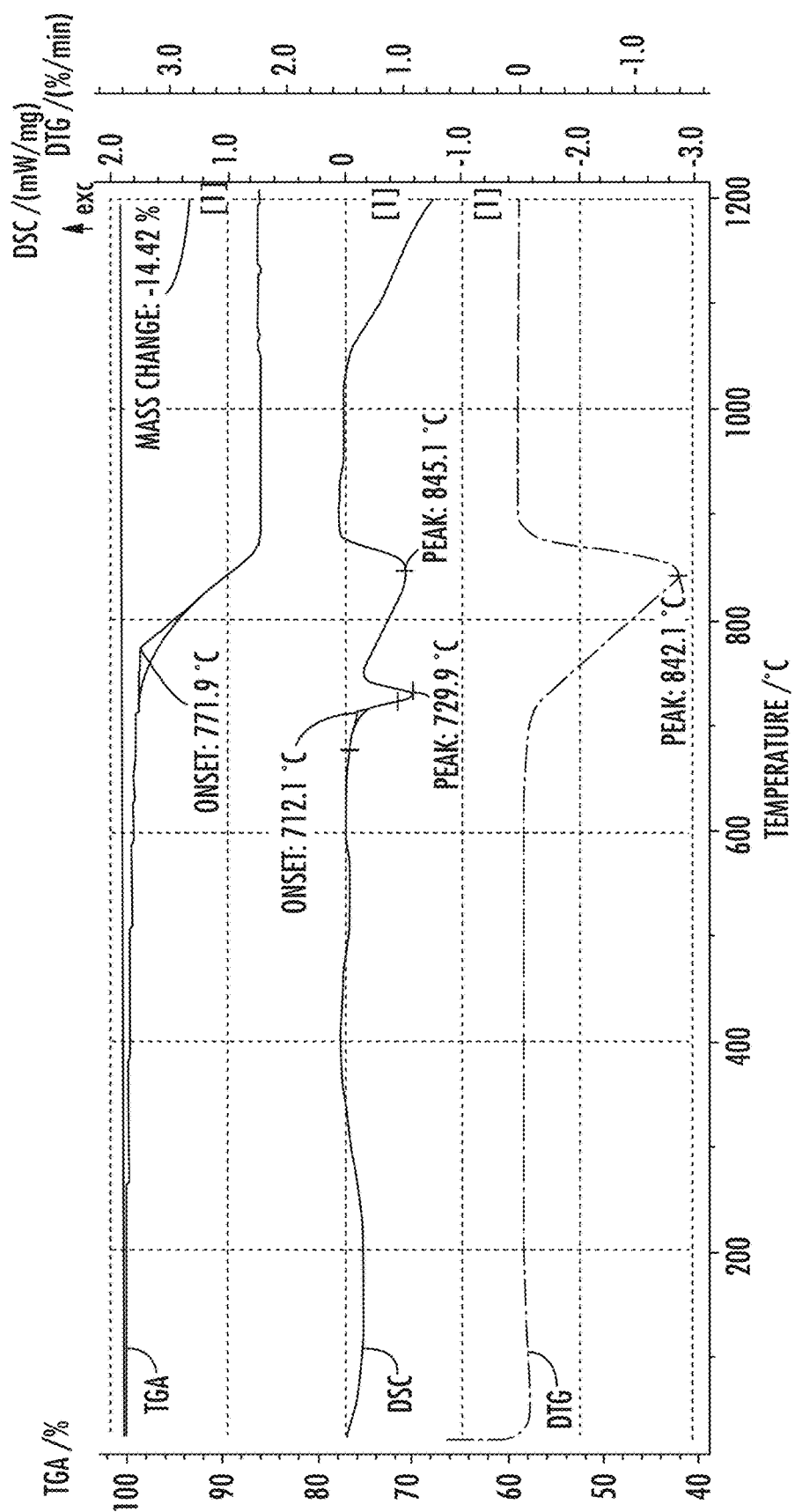
FIGS. 9A to 9C show TGA/DSC measurements for a Ga-doped LLZ garnet precursor during calcination to form garnet.
Figure 9B:
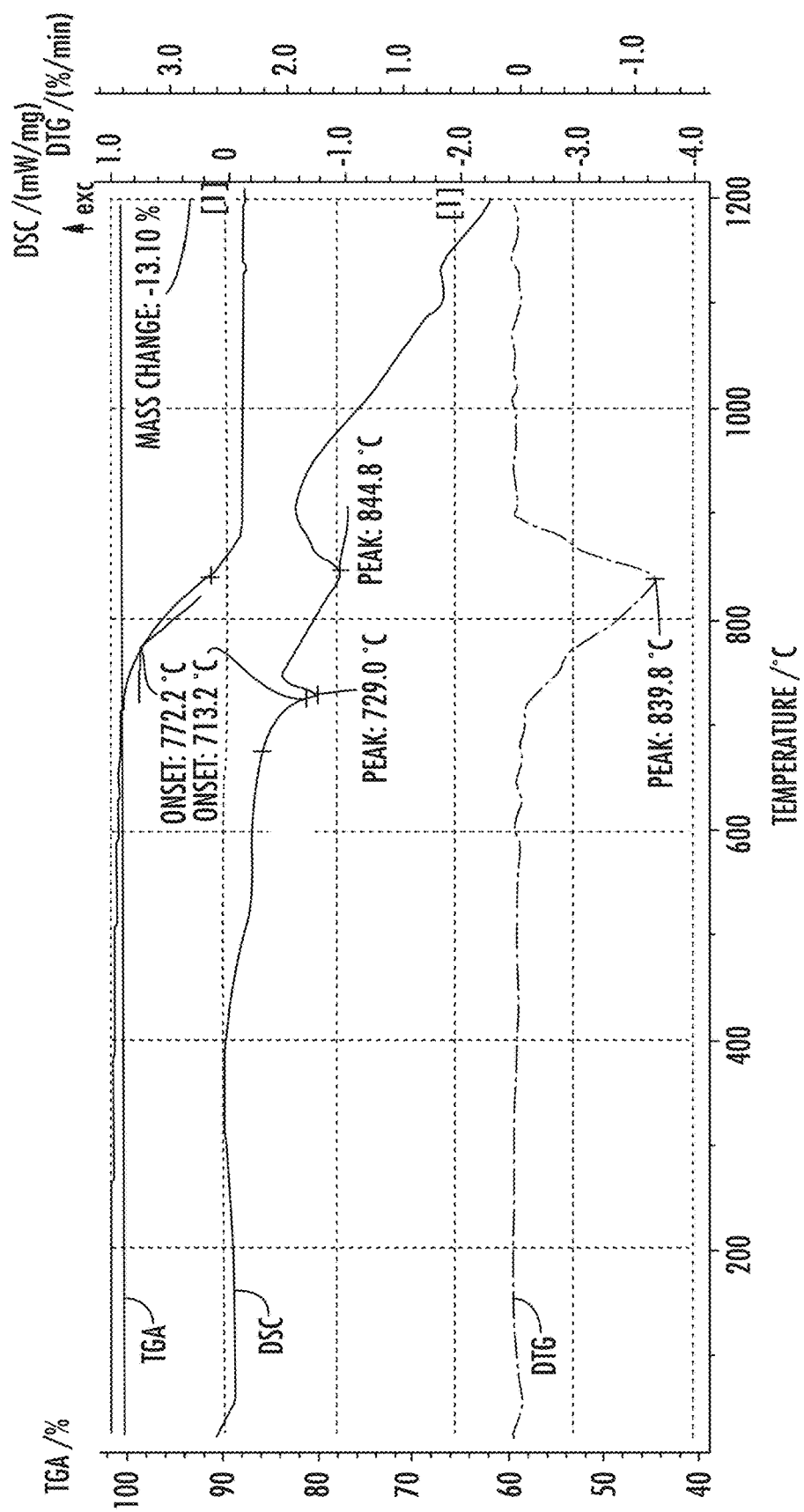
Figure 9C:
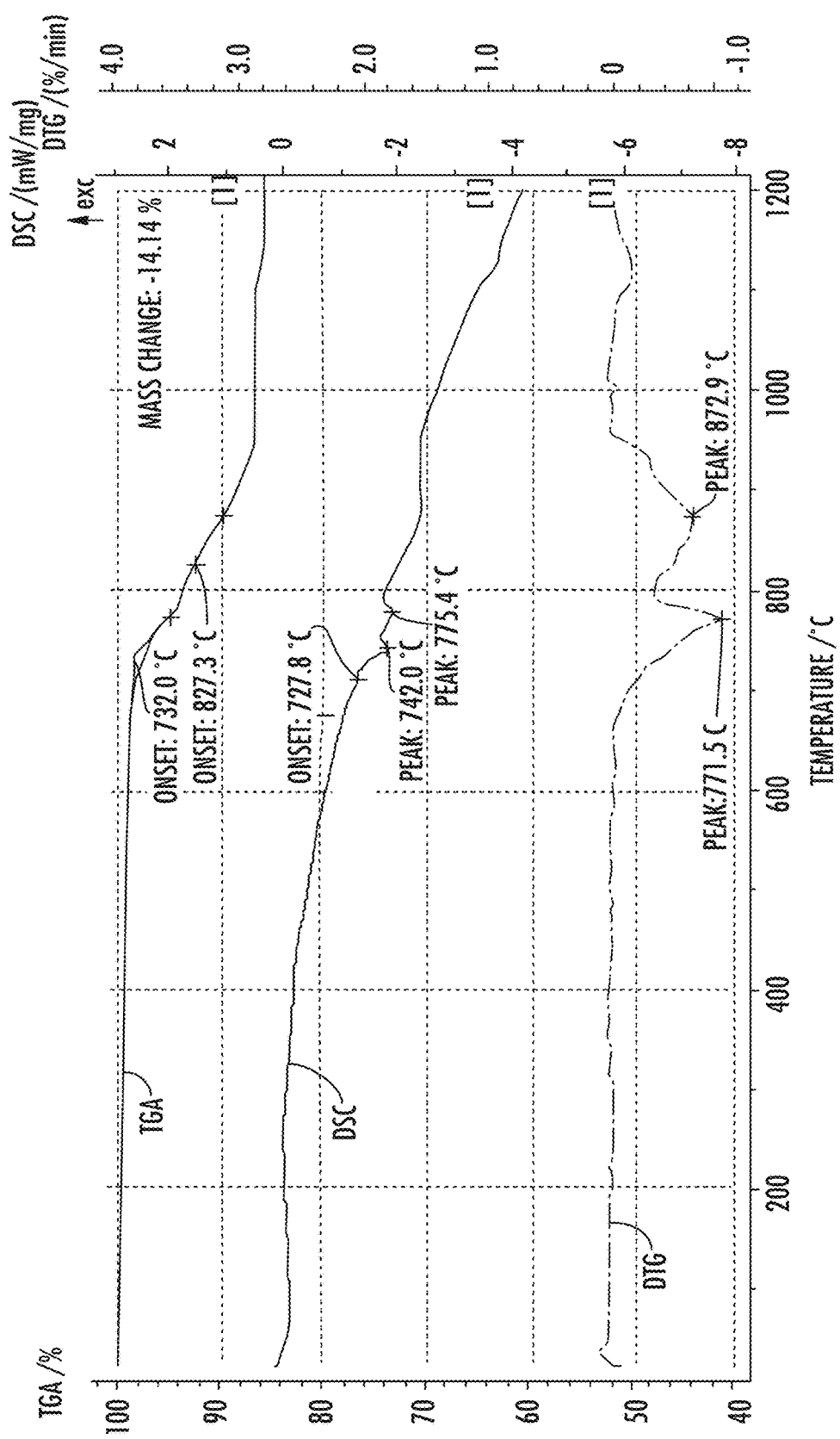

FIGS. 9A to 9C show TGA/DSC measurements for a Ga-doped LLZ garnet precursor during calcination to form garnet: a nano-powder LLZ-15 prepared by non-flame combustion with nominal molecular formula of $Li_{6.0}La_3Zr_2Ga_{0.2}Ox$ (9A); a nano-powder LLZ-17 prepared by non-flame combustion with a nominal molecular formula of $Li_{6.41}La_3Zr_2Ga_{0.6}Ox$ (9B); and a micro-powder precursor with a nominal molecular formula of $Li_{6.41}La_3Zr_2Ga_{0.6}Ox$, the same as LLZ-17 (9C). The heat ramp for all three TGA/DSC profiles was 10° C./min to 1200° C. in air and in platinum lined aluminum pans.

FIGS. 9A, 9B, and 9C show TGA/DSC measurements of two nano-powders (LLZ-15, with nominal molecular formula of $Li_{6.0}La_3Zr_2Ga_{0.2}Ox$, and LLZ-17, with nominal molecular formula of $Li_{6.41}La_3Zr_2Ga_{0.6}Ox$ and a micropowder (LPG) having the same nominal molecular formula $Li_{6.41}La_3Zr_2Ga_{0.6}O_x$ as the LLZ-17. The measurements were done by heating the powder in a Pt lined pan from room temperature to 1200° C. Two endothermal peaks were observed at 730° C., and 845° C. for both nano-powders. The 730° C. peak is from the melting of $Li_2CO_3$. The 845° C. peak is from the solid sate reaction, which accompanied with a weight loss peaked at about 840° C. in the DTG curves. This is the only reaction found for nano-powder. From XRD measurement a near 100% cubic garnet forms at 800° C., the TGA/DSC observed reaction also indicates formation of cubic garnet. The TGA measured weight loss was believed to be from the $CO_2$ given off from the $Li_2CO_3$ precursor by the solid state reaction.

For the micro-powder LPG, the DTG curve shows three major weight loss peaks from about 770° C. to about 1100° C., indicating that the solid reaction involving $Li_2(CO_3)$ in the micro-powder system occurred gradually throughout the temperature range, and finished at a much higher temperature compared to nano-powder. This is consistent with the XRD results, in which the formation of garnet is gradual and completed at about 1100° C. (i.e., top temperature or maximum temperature).

Example 4

Ga-Doped LLZ Garnet Membrane Calcination and its Microstructure

Ga-doped LLZ garnet membranes were made by pelletizing 1.5 g of Ga-doped LLZ precursor nano-powder into pellets with a diameter of 28.78 mm using 10 kpsi pressure. Calcination was done in a Pt tray with a tightly fit cover. Inside the box, a layer of Al-doped garnet micro-powder was lined a the bottom. The pellets were laid down on the Al-doped LLZ powder. On top of the pellets, another layer of Al-doped LLZ powder was spread on. This firing equipment and structure helped in preventing Li loss. The firing schedules were as follows:

| Fast schedule |
| --- |
| RT to 900° C., 200° C./hr |
| 900° C., hold for 2 hrs |
| 900° C. to top temperature, 100/hr |
| Top temperature, hold for 7 hrs |
| Top temperature to RT, 200° C./hr |

| Slow schedule |
| --- |
| RT to 800° C., 150° C./hr |
| 800° C., hold for 4 hrs |
| 800° C. to top temperature, 100/hr |
| Top temperature, hold for 7 hrs |
| Top temperature to RT, 200° C./hr | where "top temperature" refers to the maximum temperature for a specified synthesis.

After the firing, the burying powder can be easily brushed-off from the pellet surface. The Al-doped LLZ garnet micro-powder sintered at 1230° C., and the Ga-doped LLZ powder sintered at 1050° C.

Figure 10B:
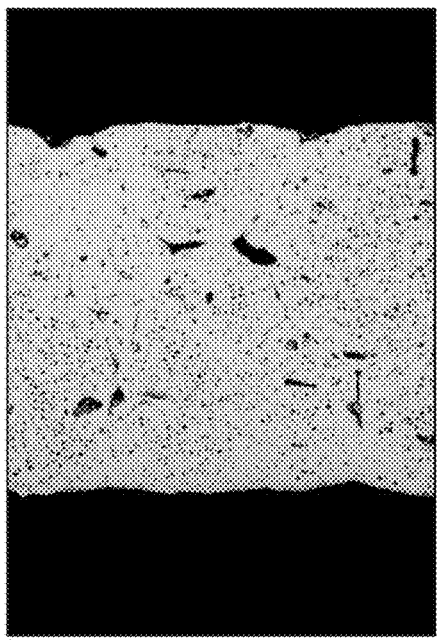
FIGS. 10A to 10C show cross-section SEM images of a Ga-doped LLZ pellet membrane fired with a fast schedule to 1180° C.: a fractured surface (10A), and a polished surface at different magnifications (10B and 10C).
Figure 10C:
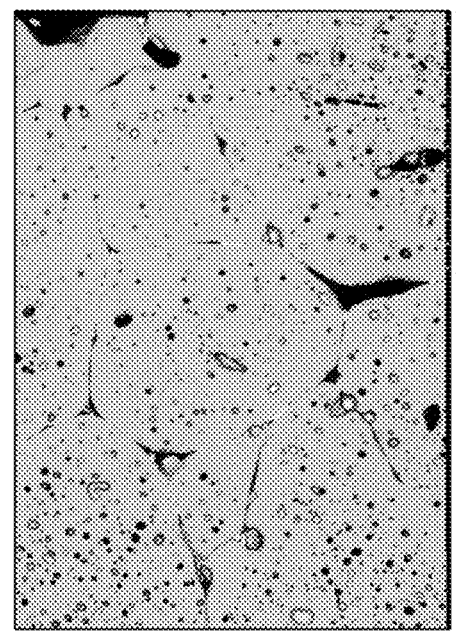
Figure 10A:
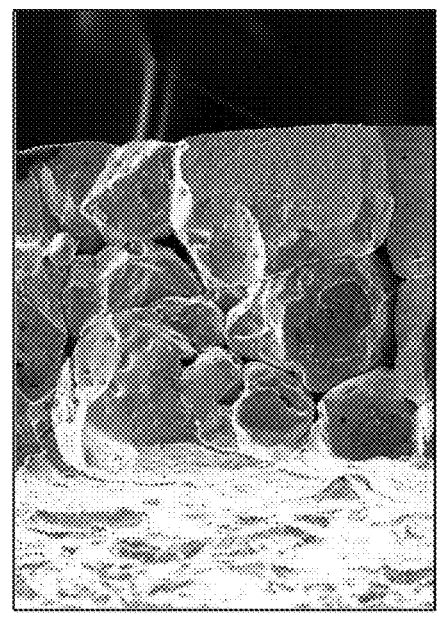
Figure 11:
FIG. 11 shows SEM images of the polished cross-section of a Ga-doped LLZ membrane. The nominal molecular formula of the precursor is $Li_{6.41}La_3Zr_2Ga_{0.6}Ox$. The grain size was larger than 600 microns.

FIGS. 10 and 11 show the SEM cross-section images of pellets from a precursor with a nominal molecular formula of $Li_{6.41}La_3Zr_2Ga_{0.6}O_x$ (LLZ-17) after firing to 1180° C. (i.e., top temperature) with the fast schedule and 1050° C. (i.e., top temperature) with the slow schedule, respectively.

In this precursor powder the Li was 23 relative % more than, or in excess of, the ideal stoichiometry for the target compound. Large grains (e.g., 200 to 600 micrometers) were developed in both pellets, especially for the slow firing, large single crystal covers the whole thickness of the pellet. The average grain size was about 500 microns.

Figure 12B:
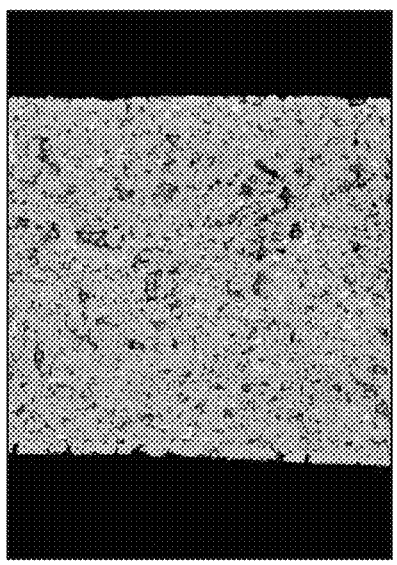
FIGS. 12A to 12C show cross-section SEM images of a Ga-doped LLZ pellet fired with a fast schedule to 1180° C. including: a fractured surface (12A); and a polished fracture surface at different magnifications (12B and 12C).
Figure 12C:
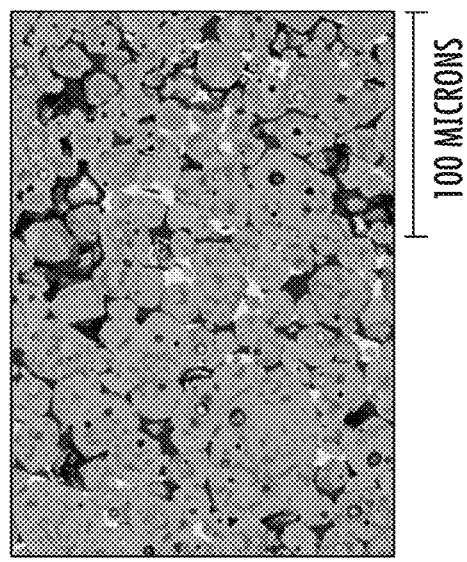
Figure 12A:
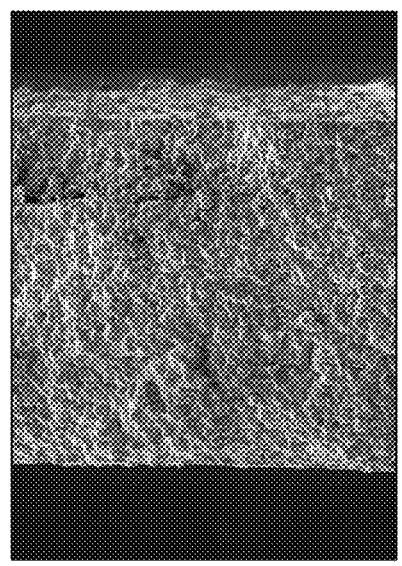

By adjusting the garnet composition, small grains can also be obtained. FIGS. 12A to 12C show the SEM images of a pellet made from precursors having a nominal molecular formula of $Li_6La_3Zr_2Ga_{0.2}O_x$, in which Li was 5 relative % less than the ideal stoichiometry for the target compound. The average grain size was about 20 microns. FIGS. 12A to 12C show cross-section SEM images of this Ga-doped LLZ pellet membrane fired with a fast schedule to 1180° C. Smaller grains of about 20 microns have been developed in this pellet.

Example 5

Ionic Conductivity of the Ga-Doped LLZ Garnet Membrane Made by the Nano-Powder

The ionic conductivity of two Ga-doped LLZ garnet membranes were measured by AC impedance. To prepare for the measurement, edges of the pellet membrane samples were abraded to remove any cracks or edge defects. The membranes were then coated with gold on both sides until each side had a resistance of less than or equal to 5 ohms ($\Omega$), which was approximately 3 to 4 microns of sputtered gold. The edges were abraded again to remove the sputtered gold, creating a resistance path directly through the membrane. At this point the membrane was tested on the AC impedance meter to obtain the impedance spectra.

Figure 13:
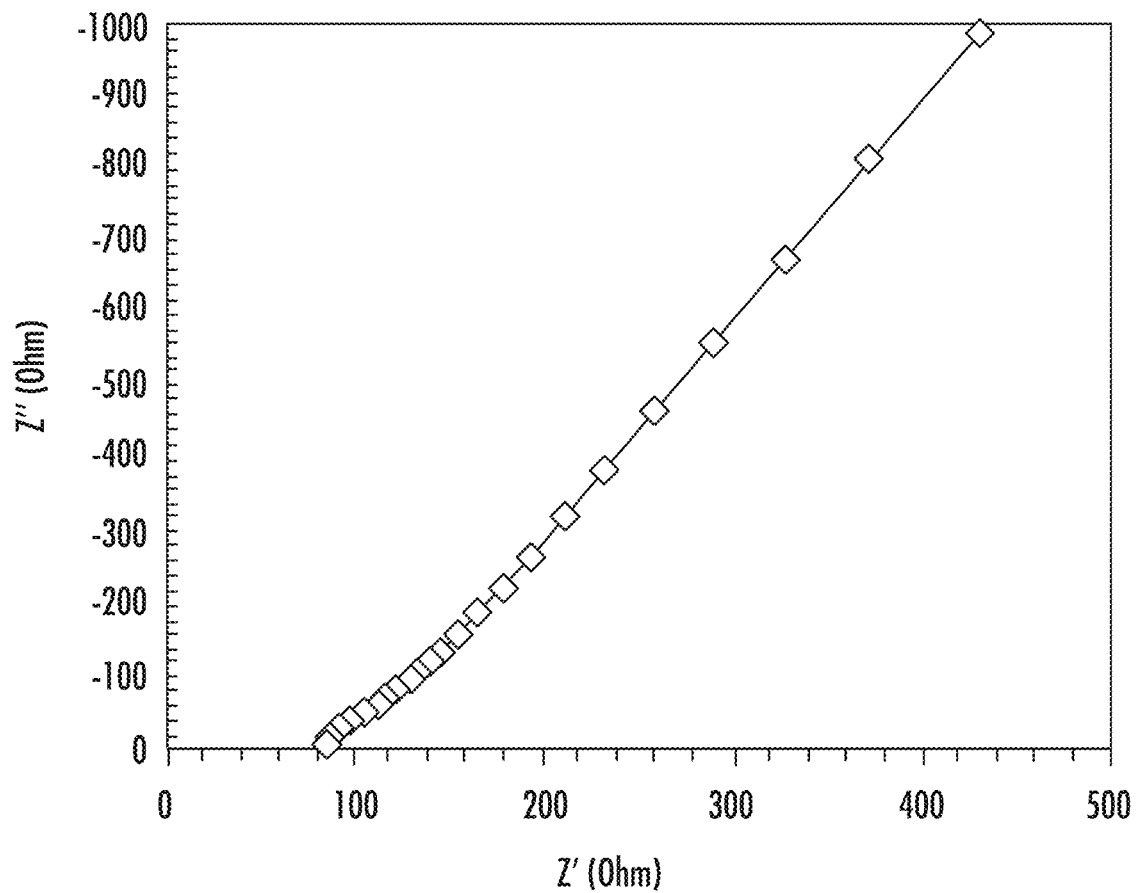
FIG. 13 shows an AC impedance curve measured from a pellet membrane sample made from $Li_{6.41}La_3Zr_2Ga_{0.6}O_x$ powder. The ionic conductivity calculated from this curve was $1.7 \times 10^{-3}$ S/cm.

As an example, a non-flame combustion made nano-powder having a nominal composition of $Li_{6.41}La_3Zr_2Ga_{0.6}O_x$, was first heated to 700° C. for 4 hours, and then pressed into pellets. The pellets was then fired to 1050° C. for 7 hours with the slow schedule shown in Example 4. During firing, the pellet was covered by an Al-doped garnet powder with nominal molecular formula of $Li_{6.6}La_3Zr_2Al_{0.3}O_x$. FIG. 13 is the AC impedance spectra from this pellet. The pellet's surface area was 0.442 cm², and the thickness was 570 microns.

Figure 14:
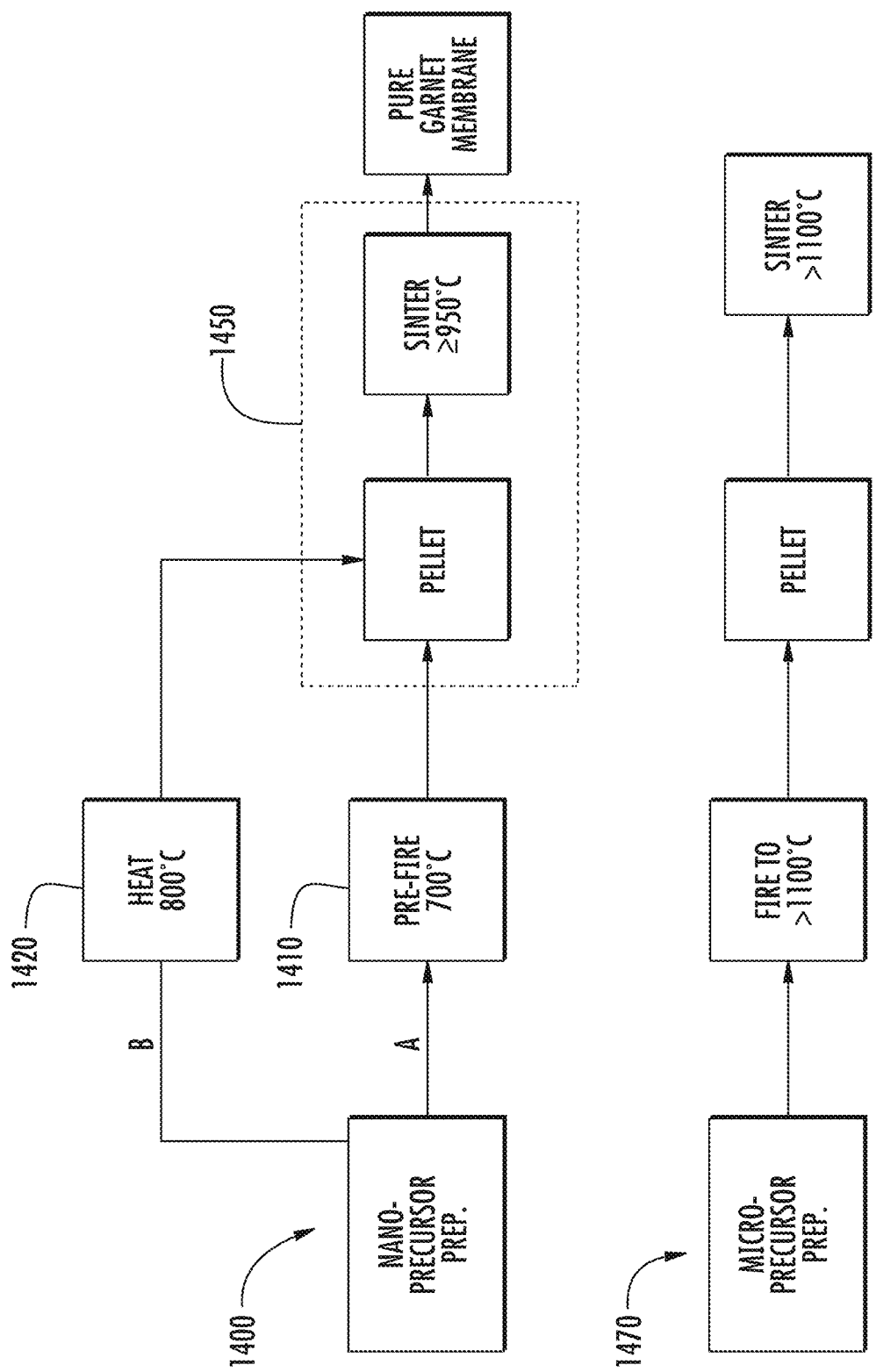
FIG. 14 shows a flow chart of the steps of the disclosed process (1400) and the steps of a comparative process (1470) (a conventional solid state reaction process).

FIG. 14 shows a flow chart of the steps of the disclosed process (1400) and the steps of a comparative process (1470) (a conventional solid state reaction process). In the disclosed membrane preparation method, a nano-sized cubic garnet precursor ash powder was pre-fired (pre-heated) at 700° C. to remove residual carbon. The product was pelletized and the pellet was heated initially to 800° C. and then heated further according to the slow heating schedule (1450) to form the disclosed dense cubic garnet membrane.

Figure 15:
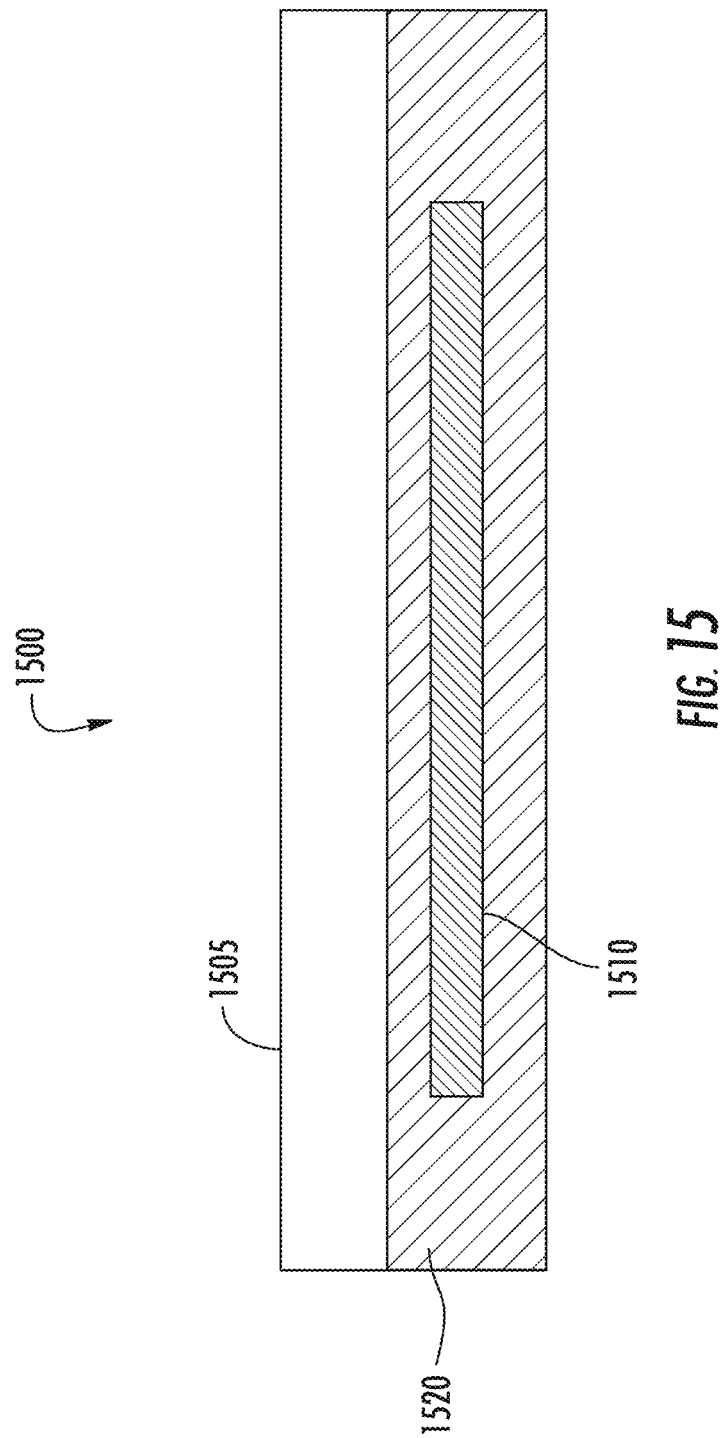
FIG. 15 shows a schematic in cross section view of the reactor (1500) configuration including a Pt container (1505) for sintering a cubic garnet pellet (1510) to a dense membrane (1510) isolated from the walls of the container by a burying powder (1520).

FIG. 15 shows a schematic in cross section view of the reactor (1500) configuration including a Pt container (1505) for sintering a green sample cubic garnet pellet (1510) to a dense membrane (1510) isolated from the walls of the container by a burying powder (1520). In embodiments, the burying powder can be, for example, the micron sized garnet precursor with dopant, such as Al, that has higher sintering temperature than the garnet for making the pellet, such a Ga-doped garnet.

Figure 16:
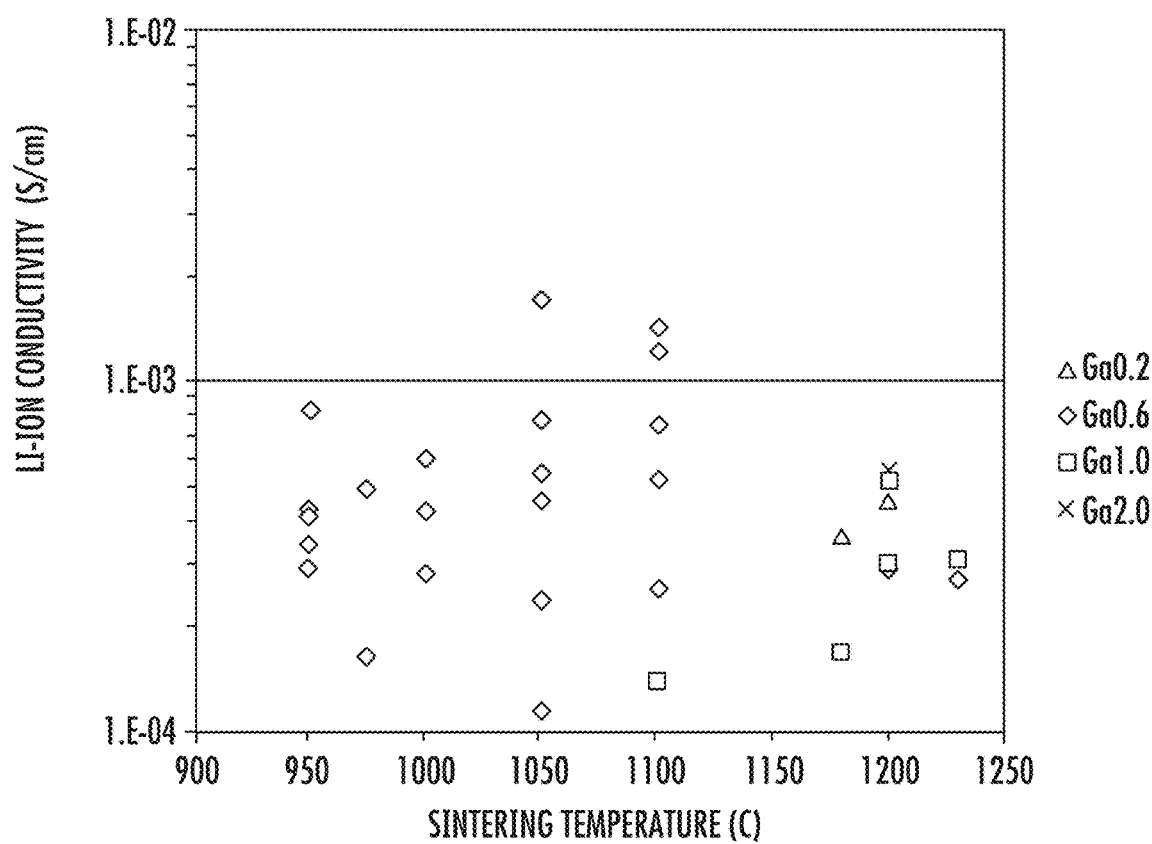
FIG. 16 shows a collection of Li-ion conductivity versus sintering temperature results from garnet membrane samples made by the disclosed nano-route.

FIG. 16 shows the Li-ion conductivity measured from the Li-oxide garnet samples made by the disclosed nano-material route. FIG. 16 shows representative Li-ion conductivity versus sintering temperature results from garnet membrane samples made by the disclosed nano-route. These samples each had different compositions and firing conditions. The x-axis is the measured sintering temperature. The Ga concentrations (0.2, 0.6. 1.0 and 2.0 with respect to the nominal molecular formula of the garnet compound) are shown in the key by the different symbols. For the compositions included in the disclosure, Ga (dopant) was interchanged for some or all of the Li in the original powder, and the La and Zr content was kept the same. Higher Ga doping allows the membranes to sinter at lower temperature as illustrated in the herein.

Figure 17:
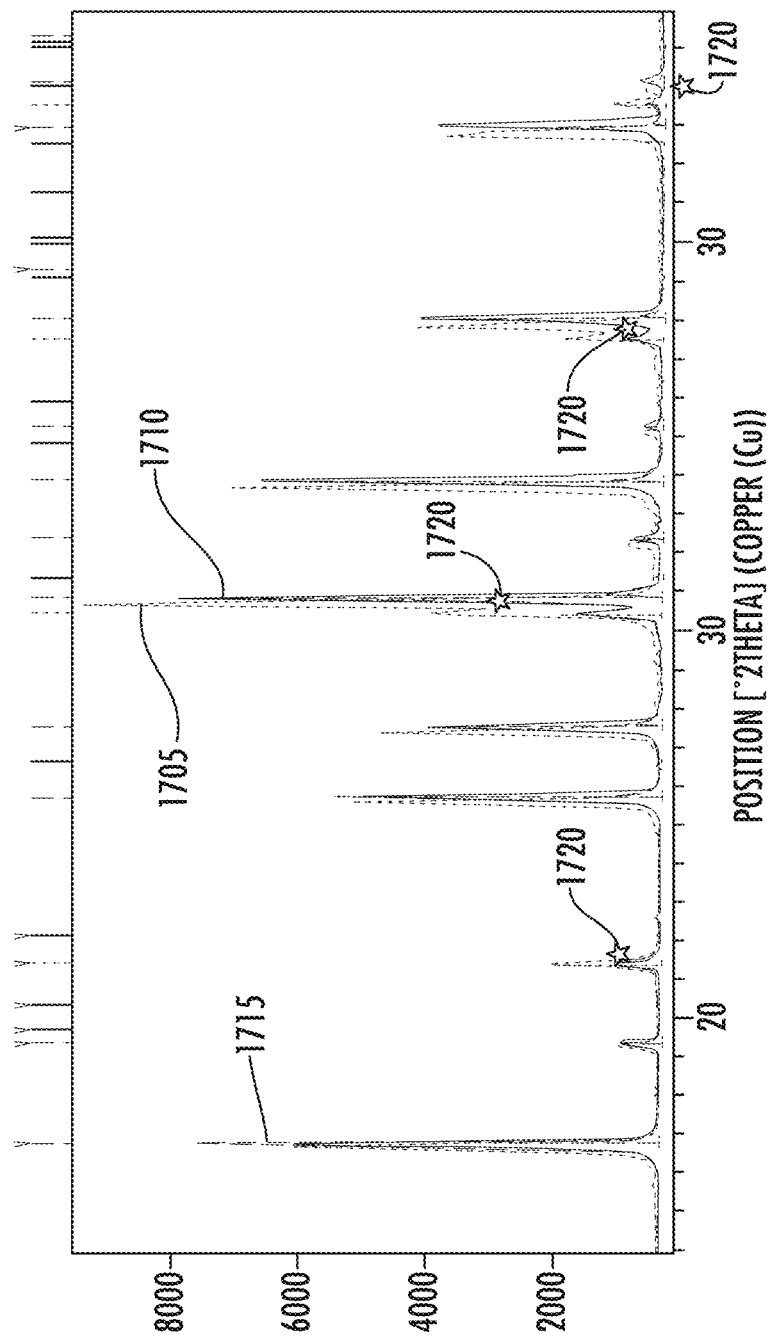
FIG. 17 shows an overlay of XRD patterns for the nano-garnet precursors, and products of the disclosure.

FIG. 17 shows an overlay of XRD patterns for the nano-garnet precursors fired to 800° C. (1705)(short dashed line weight); 1,100° C. (1710) (long dashed line weight), and known cubic garnet peaks from an XRD database (1715) (solid line weight). The XRD analyser uses known sets of the XRD peaks from their database to identify the measured XRD peaks. $LaB_6$ was used as an internal calibration reference (1720)(stars). A shift of the cubic phase patterns can be seen for the low-temperature and the high-temperature cubic garnets.

In another example, a same sample composition as above was fired to 1100° C. for 6 hrs with the same temperature ramping schedule (slow schedule), the AC impedance measured conductivity was $1.4 \times 10^{-3}$ S/cm.

In another example, a same sample composition as above was fired to 1100° C. for 7 hrs with the fast schedule, the AC impedance measured conductivity was $5.3 \times 10^{-4}$ S/cm.

In another example, a non-flame combustion made nano-powder with nominal composition of $Li_{6.0}La_3Zr_2Ga_{0.2}Ox$ was fired to 1100° C. for 6 hrs with the fast firing schedule, the AC impedance measured conductivity was $4.5 \times 10^{-5}$ S/cm.

In another example, a non-flame combustion made nano-powder with nominal composition of $Li_{6.0}La_3Zr_2Ga_{0.2}Ox$ was fired to 1180° C. for 6 hrs with the fast firing schedule, the AC impedance measured conductivity was $3.7 \times 10^{-4}$ S/cm.

In another example, a non-flame combustion made nano-powder with nominal composition of $Li_{6.0}La_3Zr_2Ga_{0.2}Ox$ was fired to 1200° C. for 6 hrs with the same temperature ramping schedule, the AC impedance measured conductivity was $4.6 \times 10^{-4}$ S/cm.

In another example, a non-flame combustion made a nano-powder having a nominal composition of $Li_{5.5}La_3Zr_2Ga_{0.52}Ox$, which was fired to 1050° C. for 7 hrs with the slow temperature ramping schedule. The AC impedance measured conductivity was $2.8 \times 10^{-4}$ S/cm. The grain size in this membrane was 1 to 10 micrometers.

In another example, a non-flame combustion made a nano-powder having a nominal composition of $Li_{5.5}La_3Zr_2Ga_{0.52}Ox$, which was fired to 1100° C. for 6 hrs with the fast temperature ramping schedule. The AC impedance measured conductivity was $6.5 \times 10^{-4}$ S/cm. The grain size in this membrane was 100 to 500 micrometers.

In another example, a non-flame combustion made a nano-powder having a nominal composition of $Li_{5.5}La_3Zr_2Ga_{0.52}Ox$, which was fired to 950° C. for 30 hrs. The AC impedance measured conductivity was $4.2 \times 10^{-4}$ S/cm. The grain size in this membrane was a mixture of 1 to 5 micrometers small grains and 100 to 200 micrometers large grains.

All of the disclosed cubic garnet samples are "dense" or hermetic in that they have little or no porosity. The apparent density of the sample over the helium gas pycnometry measured density was above 95%. This means that the open pore porosity is less than 5%. The apparent density of the garnet sample is calculated by the sample weight divided by the apparent volume of the sample. Helium gas pycnometry measures density without considering open pores.

Example 6

X-Ray Diffraction (XRD) Lattice Constant Determination for Low and High Temperature Fired Cubic Garnet Samples.

Table 1 lists measured lattice constants for cubic garnet samples prepared with the disclosed low temperature firing or a high temperature firing. The lattice constants were determined by standard XRD powder methods. $LaB_6$ was added as an internal standard for accurate lattice constant measurement.

TABLE 1

Lattice constants for low and high temperature fired cubic garnet.

| Firing temperature | Lattice constant |
|---|---|
| Low temperature cubic garnet (800 to 1000° C.) | 13.0450(1) Å |
| High temperature cubic garnet (greater than 1000° C.) | 12.9752(1) Å |

The disclosure has been described with reference to various specific embodiments and techniques. However, many variations and modifications are possible while remaining within the scope of the disclosure.

What is claimed is:

1. A method of making a Li-ion conductive cubic garnet, comprising:
    forming a nitrate source aqueous solution comprising a first nitrate source and a nitrate dopant source;
    contacting the nitrate source aqueous solution and a carbohydrate source and heating in a first heating step to form a nano-particle ash;
    a second heating step of the nano-particle ash to produce a garnet nanoprecursor;
    pelletizing the garnet nanoprecursor to form a Li-ion conductive cubic garnet pellet; and
    a third heating step of the garnet pellet to form a dense Li-ion conductive cubic garnet membrane.

2. The method of claim 1, wherein:
    the first nitrate source comprises a mixture of $LiNO_3$, $La(NO_3)_3$, and $ZrN_2O_7$;
    the nitrate dopant source is at least one element from Groups IIA to VIIA, and IIIB to IVB;
    the carbohydrate source has from 5 to 10 carbon atoms; and
    the nano-particle ash has a size in a range of 10 nm to 50 nm.

3. The method of claim 1, wherein the dense Li-ion conductive cubic garnet membrane has a Li-ion conductivity in a range of $0.2 \times 10^{-3}$ S/cm to $2.0 \times 10^{-3}$ S/cm.

4. The method of claim 1, wherein the third heating step is conducted in a closed platinum vessel, and wherein the garnet pellet is a pellet surrounded in a garnet burying powder comprising at least one micrometer sized Li-oxide garnet.

5. The method of claim 1, wherein the nitrate dopant source is at least one of a metal nitrate, or a mixture of at least two different metal nitrates.

6. The method of claim 1, further comprising: adding from 1 wt. % to 20 wt. % excess of a nitrate source containing Li to compensate for Li losses during the third heating step.

7. The method of claim 1, wherein a mole ratio of the nitrate source aqueous solution to the carbohydrate source in the contacting step is in a range of 1:1 to 1:4.

8. The method of claim 7, wherein the first heating step is conducted at a temperature in a range of 200° C. to 550° C.

9. The method of claim 1, wherein the second heating step is conducted at a temperature in a range of 650° C. to 700° C. to form nano-sized garnet nanoprecursor particles having a size in a range of 10 nm to 100 nm.

10. The method of claim 1, wherein the third heating step is conducted at a temperature in a range of 950° C. to 1200° C. for a time in a range of 0.5 hr to 30 hrs.

11. The method of claim 10, wherein the third heating step is held at 800° C. for a time in a range of 2 hrs to 6 hrs to form and stabilize a pure cubic garnet phase.

12. A method of making a Li-ion conductive cubic garnet, comprising:
forming a nitrate source aqueous solution comprising of a first nitrate source and a nitrate dopant source;
contacting the nitrate source aqueous solution and a carbohydrate source and heating in a first heating step to form a nano-particle ash;
a second heating step of the nano-particle ash to produce a Li-ion conductive pure cubic garnet powder;
milling the cubic garnet powder to produce a sub-micron powder;
pelletizing the sub-micron powder to form a garnet pellet; and
a third heating step of the garnet pellet to form a dense Li-ion conductive cubic garnet membrane.

13. The method of claim 12 wherein:
the first nitrate source comprises a mixture of $LiNO_3$, $La(NO_3)_3$, and $ZrN_2O_7$;
the nitrate dopant source is at least one element from Groups IIA to VIIA, and IIIB to IVB;
the carbohydrate source has from 5 to 10 carbon atoms;
the cubic garnet powder comprises irregularly-shaped, porous particles before milling;
the sub-micron powder comprises sub-micron-sized particles having a size in a range of 100 nm to 1000 nm after milling.

14. The method of claim 12, further comprising: adding from 1 wt. % to 20 wt. % excess of a nitrate source containing Li to compensate for Li losses during the third heating step.

15. The method of claim 12, wherein the dense Li-ion conductive cubic garnet membrane has a Li-ion conductivity in a range of $0.2 \times 10^{-3}$ S/cm to $2.0 \times 10^{-3}$ S/cm.

16. The method of claim 12, wherein a mole ratio of the nitrate source aqueous solution to the carbohydrate source in the contacting step is in a range of 1:1 to 1:4.

17. The method of claim 16, wherein the first heating step is conducted at a temperature in a range of 200° C. to 550° C.

18. The method of claim 12, wherein the second heating step is conducted at a temperature in a range of 775° C. to 1000° C. to form Li-ion conductive pure cubic garnet powder having irregularly-shaped micron-sized particles.

19. The method of claim 12, wherein the third heating step is conducted at a temperature in a range of 950° C. to 1200° C.

* * * * *

UNITED STATES PATENT AND TRADEMARK OFFICE
CERTIFICATE OF CORRECTION

PATENT NO. : 10,396,396 B2
APPLICATION NO. : 15/994276
DATED : August 27, 2019
INVENTOR(S) : Michael Edward Badding et al.

It is certified that error appears in the above-identified patent and that said Letters Patent is hereby corrected as shown below:

On the Title Page

Page 2, Column 1, item [56], Line 13, delete "Stronitum" and insert -- Strontium --, therefor.

Page 2, Column 2, item [56], Line 4, delete "Additivies" and insert -- Additives --, therefor.

Page 2, Column 2, item [56], Line 38, delete "Electrochemisty" and insert -- Electrochemistry --, therefor.

In the Specification

Column 1, Line 12, delete "IJ.S." and insert -- U.S. --, therefor.

In the Claims

Column 17, Line 19, Claim 12, after "comprising" delete "of".

Signed and Sealed this
Seventh Day of January, 2020

Andrei Iancu
*Director of the United States Patent and Trademark Office*